US012725992B2

(12) United States Patent
Stepan et al.

(10) Patent No.: US 12,725,992 B2
(45) Date of Patent: Sep. 1, 2026

(54) CONNECTION CONNECTING TECHNIQUE FOR AN LED PROFILE SYSTEM, AND LED PROFILE SYSTEM

(71) Applicant: Stepan Engineering GmbH, Mels (CH)

(72) Inventors: Peter Stepan, Mels (CH); Thomas Stepan, Maienfeld (CH)

(73) Assignee: Stephan Engineering GmbH, Mels (CH)

( * ) Notice: Subject to any disclaimer, the term of this patent is extended or adjusted under 35 U.S.C. 154(b) by 379 days.

(21) Appl. No.: 18/681,616

(22) PCT Filed: Aug. 6, 2021

(86) PCT No.: PCT/IB2021/057271
§ 371 (c)(1),
(2) Date: Feb. 6, 2024

(87) PCT Pub. No.: WO2023/012507
PCT Pub. Date: Feb. 9, 2023

(65) Prior Publication Data
US 2024/0347991 A1 Oct. 17, 2024

(51) Int. Cl.
*H01R 33/92* (2006.01)
*H01R 12/61* (2011.01)

(52) U.S. Cl.
CPC ............. *H01R 33/92* (2013.01); *H01R 12/61* (2013.01)

(58) Field of Classification Search
CPC ........ H01R 33/92; H01R 12/61; H01R 12/62; H01R 12/714; H01R 12/718;
(Continued)

(56) References Cited

U.S. PATENT DOCUMENTS 4,934,956 A * 6/1990 Conti ...................... A47F 11/10 439/492
5,742,484 A 4/1998 Gillette et al.
(Continued)

FOREIGN PATENT DOCUMENTS

AT 16836 U1 10/2020
CH 712 189 A1 9/2017
(Continued)

OTHER PUBLICATIONS

International Search Report Corresponding to PCT/IB2022/057316 mailed Nov. 14, 2022.
(Continued)

*Primary Examiner* — Travis S Chambers
(74) *Attorney, Agent, or Firm* — Secant IP, PLLC

(57) ABSTRACT

The invention relates to an electrical connection system in LED profile systems (60) and its components and the assembly of said components. The connection system comprises, in particular, an electrical connection element (40) for supplying electrical power to an LED strip (70) which is in the form of a flexprint strip (41). The connection element (40) has a supply connection length region (43) with exposed longitudinal conductor tracks (42), an LED connecting length region (44) with longitudinal conductor tracks (42) in the positions of the connections of the LED strip (70) and an adhesive area (45) on the rear side of the connection element (40). Here, the electrical connection element (40) can be folded over at a bending point (46) between the supply connection length region (43) and the LED connecting length region (44), so that they come to rest on opposite sides of the profile system (60). As an alternative or in addition, the electrical connection system also comprises an associated electrical connector (50) for supplying electrical power to the LED strip (70) which has a PCB (51) or a leadframe (51) encapsulated by injection moulding and
(Continued)

having spring contacts (52) on a bottom side (54) and a cable outlet (67) with cable connections (53) on a top side (55), wherein a clip element (56) is formed for attachment to the profile system (60).

21 Claims, 12 Drawing Sheets

(58) Field of Classification Search
CPC ....... H01R 12/732; H01R 25/145; F21S 4/28; F21Y 2103/10; F21Y 2115/10; H05K 1/189; H05K 1/147; H05K 2201/055; H05K 2201/056; H05K 2201/09236; H05K 2201/09363; H05K 2201/09936; H05K 2201/10106; F21V 21/005; F21V 21/35; F21V 15/013; F21V 23/06
See application file for complete search history.

(56) References Cited

U.S. PATENT DOCUMENTS

| | | | | |
|---|---|---|---|---|
| 6,027,347 | A | 2/2000 | Reichle | |
| 7,210,818 | B2 * | 5/2007 | Luk | H05K 1/189 362/249.14 |
| 8,262,250 | B2 * | 9/2012 | Li | F21S 4/24 362/249.02 |
| 9,103,513 | B2 * | 8/2015 | Fan | H05K 1/189 |
| 10,323,837 | B2 | 6/2019 | Hierzer | |
| 10,446,787 | B2 | 10/2019 | Lang | |
| 12,537,322 | B2 * | 1/2026 | Bartek | H01R 12/613 |
| 2013/0182422 | A1 | 7/2013 | Guilmette | |
| 2014/0265809 | A1 | 9/2014 | Hussell | |
| 2016/0033098 | A1 | 2/2016 | Bergman et al. | |
| 2019/0316765 | A1 | 10/2019 | Lin | |
| 2025/0271127 | A1 * | 8/2025 | Hierzer | F21V 21/35 |

FOREIGN PATENT DOCUMENTS

| | | | | |
|---|---|---|---|---|
| DE | 10 2008 013 454 | A1 | 7/2010 | |
| DE | 10 2012 005 982 | A1 | 9/2013 | |
| DE | 10 2013 208 400 | A1 | 11/2013 | |
| DE | 10 2014 103 974 | A1 | 9/2014 | |
| DE | 10 2016 119 987 | A1 | 4/2018 | |
| DE | 202019100511 | U1 | 2/2019 | |
| EP | 0 162 124 | A1 | 11/1985 | |
| EP | 2 827 053 | A1 | 1/2015 | |
| EP | 3 312 506 | A1 | 4/2018 | |
| EP | 3 336 420 | A1 | 6/2018 | |
| EP | 3 427 555 | B1 | 1/2019 | |
| TW | I381127 | B * | 1/2013 | |
| WO | 97/15965 | A1 | 5/1997 | |
| WO | WO-2008003289 | A2 * | 1/2008 | G09F 9/301 |
| WO | 2014/045494 | A1 | 3/2014 | |
| WO | 2015/183848 | A1 | 12/2015 | |
| WO | 2019/243225 | A1 | 12/2019 | |
| WO | 2020/194236 | A1 | 10/2020 | |

OTHER PUBLICATIONS

Written Opinion Corresponding to PCT/IB2022/057316 mailed Nov. 14, 2022.
International Search Report Corresponding to PCT/IB2021/057271 mailed Jun. 17, 2022.
Written Opinion Corresponding to PCT/IB2021/057271 mailed Jun. 17, 2022.
Invitation to Pay Additional Fees Corresponding to PCT/IB2021/057271 mailed Apr. 26, 2022.

* cited by examiner 64
65
63
46
40
60

64
50
40
60
67

64
65
60
40
52
50
51
53
61
62
70
71
67
73

64
42
10
40
74
76,77
72
70
60
71

67
57b
82
49
40
60

53
51b
52
57b 52
57b
53
51b 52
53
57b
51b 67
53
51b
57b,56

CONNECTION CONNECTING TECHNIQUE FOR AN LED PROFILE SYSTEM, AND LED PROFILE SYSTEM

This application is a National Stage completion of PCT/IB2021/057271 FILED Aug. 6, 2021.

FIELD OF THE INVENTION

The invention relates to an electrical connection system for LED profile systems or its components and their composition. Specifically an electrical connection element for the electrical supply of an LED strip and/or an electrical connector for the electrical supply of the LED strip. Also covered are corresponding systems and combinations of the components of the connection system, as well as lighting systems, luminaire profiles and their components in conformation and equipment according to the invention. A method for electrically connecting LED profiles or for providing such a connection is also included.

BACKGROUND OF THE INVENTION

LED light profiles or LED lighting profiles are well known in a wide variety of embodiments. For example, EP 3 336 420 discloses a lighting system with a channel for receiving a light unit that can be inserted into the channel and a connector that can be inserted into the channel. The channel has a busbar in an interior area for supplying and electrical coupling of the light unit. The connector is configured to electrically couple busbar sections of the busbar to one another. Furthermore, the connector is adapted for mechanical coupling with sections of the channel. The channel and the connector are configured in such a manner that the light unit in the inserted state is arranged in an overlapping manner with the inserted connector within the channel.

EP 3 312 506 discloses a light-emitting diode strip with a flexible profile made of extruded plastic that is open on one side, and two electrical leads integrated inside a wall of the profile, which run parallel to one another in the wall and at the ends have plug connectors or free wire ends for linking the light-emitting diode strips with one another. Recesses as far as the electrical leads in the wall form contact surfaces for the connection of flexible lead carriers with chip light-emitting diodes arranged thereon. With a transparent or translucent potting compound filling the inside of the profile, the flexible lead carriers with the chip light-emitting diodes are protected from moisture or weather influences. The flexible lead carriers are connected in parallel with the electrical leads, wherein the total current flows through the leads of the profile connected by means of plug connectors or free wire ends and wherein the light-emitting diode strip is flexible vertically to the direction of extension.

DE 10 2014 103 974 discloses a busbar for connecting light-emitting diodes, in particular LED circuit boards, consisting of a carrier profile with electrical conductors for the electrical connection of the LED lamps. The carrier profile is configured as a one-piece extrusion moulded part. The electrical conductors consist of conductor tracks arranged in a firmly bonded and/or positive manner on the extrusion profile.

US 2013/0182422 relates to a modular lighting system, which provides a universal mounting option for lighting elements, such as, inter alia, LED lights, as well as various electrical devices and can be configured in several operating modes. LED strips are inserted into slots in the underside the busbar part or LED of operate tubular lamps.

Alternatively, discrete electrical or electromechanical components can be used, which are supplied by the electrical energy available in the busbar. In a further embodiment, an upward and downward-directed bidirectional lighting system is provided.

AT 16836 U1 discloses a busbar that has a profile-like carrier element that extends along a longitudinal axis. Held on the carrier element, electrical conductor tracks are arranged for through-wiring and, if necessary, for signal transmission. In addition, the busbar has LEDs arranged on the carrier element, which are electrically connected to the conductor tracks for their power supply, so that the busbar is configured to emit light directly. As a result, it is no longer necessary that an LED light module is connected to a support rail. In addition, it can be achieved in this way that the busbar can be designed with a particularly small cross-section, with the stated aim of achieving an improved external appearance.

In DE 10 2013 208 400, an LED strip is designed in two layers, wherein a first layer consists of a conductor film on which LEDs and corresponding conductor tracks are provided, and wherein a second layer consists of a supply rail with two power lines, the diameter of which is at least 10 times larger than the thickness of the conductor tracks. The conductor film and the supply rail are connected to each other and each LED is mechanically connected to the busbars separately via conductor tracks and contact points.

The disadvantage of these known solutions is that they have a complex and static structure and have little flexibility. In addition, these usually represent static individual solutions for special problems which cannot be combined with one another in a trivial and flexible manner. For example, their assembly is difficult in many aspects or assembly situations, especially if construction tolerances are not adhered to, or if there are predetermined, previously not completely known conditions during retrofitting.

SUMMARY OF THE INVENTION

The object of the present invention is therefore to create a device which does not have the aforementioned disadvantages; in particular, an improved LED profile or a connection system for an LED profile with very small dimensions is sought. An example of a specific structure is a cross-section of 14×16 mm. The aim is that small dimensions are provided in the structure and nevertheless relatively high currents are possible. As a result, long distances can be realized without additional feed-in. The aim is to provide a simple and flexibly-designed electrical connection for the profiles, which also enables good and flexible configurability of the LED profiles, especially during their production and/or their assembly.

Different requirements for the electrical connection, which are obtained depending on the embodiment or design of the profile or design of the assembly site should be covered as flexibly as possible by a common system, e.g. also with regard to length adjustments, denominations, angles, cable outlet positions at the assembly site, etc.

The aim is also to achieve a connection that can preferably be produced as far as possible without tools or with minimal tools, which can preferably also be easily separated again in the event of service. One object is to provide a type of flexible modular system for contacting or electrically connecting LED profiles.

The object is achieved by the features of the independent claims. Advantageous further developments are set out in the figures and in the dependent patent claims.

According to the invention, an electrical connection element is provided, configured for the electrical supply of an LED strip which is fastened in a profile system; for example, in a luminaire profile for room or building lighting, in which the LED strip is glued, inserted, clamped or screwed on the inside in a substantially H-shaped profile made of metal, plastic, etc. According to the invention, the electrical connection element is configured as a flexprint strip, which has:

a supply connection length region, which is configured with at least two exposed longitudinal conductor tracks, which uninsulated conductor tracks can be electrically contacted by applying electrical contacts (for example also via plugs) or by soldering. These longitudinal conductor tracks, which can be contacted from the outside, are arranged-preferably insulated from one another-substantially parallel to one another and thereby take up a substantial part of the length of the supply connection length region throughout-preferably more than 50% or 75%.

An LED connecting length region, which can be electrically connected to at least two longitudinal conductor tracks, the positions of which correspond to the connections of the LED strip, and to the LED strip. In particular, these longitudinal conductor tracks can be arranged and configured as open and uninsulated, preferably gold-plated, contactable conductor track strips, insulated from one another and substantially parallel to one another in such a manner that they can be electrically connected to contact pads for the electrical connection of the LED strip; e.g. by soldering or by pressing on a connecting element. The longitudinal conductor tracks of the supply connection length region are electrically connected to one another with the longitudinal conductor tracks of the LED connecting length region.

An adhesive surface which is provided on the rear side of the electrical connection element, i.e. on the opposite side of the conductor tracks, and is preferably continuous and/or over the entire surface. With this adhesive surface, the connection element can preferably be permanently fixed to a surface. It can be produced, for example, in the form of applied adhesive or double-sided adhesive tape, wherein a protective strip that can be removed before assembly protects the adhesive surface.

The electrical connection element can be folded over at a bending point or bend point, which lies between the supply connection length region and the LED connecting length region. At this bending point or bend point, the electrical connection element can be folded or bent by 180° or twice 90° during assembly, in which case—for technical reasons—usually no sharp bends, but rather a certain bending radius or an arc are obtained. An embodiment of the electrical connection element is therefore configured in such a way that:

its LED connecting length region can be attached on a first side (or underside or light side) of the profile system;

at the end of the profile system (i.e. on the top side or front side) at the bending point the connection element can be folded by 180 degrees around a partition or an intermediate web of the profile system, and its supply connection length region can be attached on a second side (or top side or connection side) of the profile system.

With the electrical connection element according to the invention, an electrical contacting of the LEDs on the underside can be accomplished in a simple manner from the top side especially without the need for holes, openings or recesses in the profile system. With the system according to the invention, a plurality of feed points along an LED profile lighting system are also possible without much effort, for example to compensate for the voltage drop along the LED strip through multiple cable feeds. The multiple feeds are flexible and the exact positions of the cable outlets are not important since the connection system provides tolerances and variability in the axial direction.

LED strips, also known as LED strips or LED tape, are preferably flexible flat conductors or flex circuit board strips or tapes on which LEDs and possibly at least some of their control circuitry are attached. These flexible flat conductors or flex circuit board strips or tapes can usually be separated into sections or connected in discrete lengths at defined separation points, so that their length can be adjusted in discrete steps. For example, WO 2020/194236 or documents cited thereto disclose embodiments of such LED strips.

The flexprint strip is, for example, a strip-shaped (i.e. flat and elongated), flexible film circuit board made of an insulating film material on or in which flat, metallic conductor tracks are formed, which can be electrically contacted via exposed, preferably gold-plated contact surfaces.

The number of conductor track strips preferably corresponds to that of the poles or connections of the LED strip. In a special embodiment, one pole of the supply can also be guided via the metal profile system per se and, accordingly, the electrical connection element can also have one less pole, e.g. only a single pole or conductor track strip.

Preferably, the flexprint strip has a being point marking at a preferred bending point. Thus the electrical connection element can be mounted at a preferred location at the top end of the profile system. In a preferred embodiment, the connection element can be insulated in the area of the bending point, i.e. have no open conductor tracks that can be contacted from the outside in order to avoid unintentional short circuits. In another embodiment, such insulation can also be achieved via a, for example, plugged-on insulating element.

Preferably, a reinforcing element is applied to the flexprint strip-following the bending point marking—in particular at the supply connection length region. The reinforcing element can also form the bending point marking itself. On this preferably electrically non-conductive reinforcing element, for example, an end cap or a profile connector can be attached using a screw without running the risk of damaging the electrical connection element. The reinforcing element can also serve as strain relief and/or provide the aforesaid insulation. In particular, it can be glued on or plugged onto the bent electrical connection element as a clip on the top side of the profile system.

The LED connecting length region is preferably provided with a measuring system or tape measure scale. This can start with zero, in particular at the bending point marking, so that in the mounted state a distance from the end of the profile system can be read off there in a unit of measurement—such as e.g. in mm. This means that assembly of the LED profile system can be simplified, e.g. by subtracting the maximum possible LED strip length due to the divisibility sections of the LED strip from the length of the profile system. If the LED strip is now applied to half of this difference on the tape measure scale of the electrical connection element according to the invention and soldered there, the LED strip is always attached symmetrically in the middle of the profile system. Accordingly, the tape measure scale can also be labelled with twice the actual length units, so that no division is necessary, but the strip only needs to be applied to the number of the length difference.

Preferably, the LED connecting length region can have a length of its conductor tracks which is at least half the divisibility length of the LED strip and/or is smaller than this divisibility length. This means that any length of the profile system can be covered (with the lowest possible material expenditure).

Preferably, the electrical connection element is configured to interact with an electrical connector (specifically as described below)—preferably in a releasable manner, e.g. with magnets, plug-on, snap-on or clip-on—in particular in such a way that a snapped-on electrical connector on the electrical connection element can be moved along the profile direction. This means that a connection can be provided that is flexible in its position and can be adapted to the circumstances, for example during assembly or when fitting in, or construction tolerances in the cable outlet or the like can be compensated for. It can also simplify assembly if the connecting cables have clearance in the longitudinal direction when guiding the profile to the ceiling.

Preferably, a stopper element can be applied to the flexprint strip at one end of the supply connection length region, which provides a longitudinal stop at the end of the supply connection length region. Thus, any displacement of an associated contacting element or an electrical connector (see below) beyond the supply connection region can be prevented. In another embodiment, the stopper element can also be dispensed with, or this can be configured to be removable or able to be cut off, especially if a lengthening of the supply connection length region (see below) is required.

Preferably, the supply connection length region has a length of the exposed, uninsulated longitudinal conductor tracks in a range of 5 cm to 15 cm, in particular approximately 7 cm, wherein the supply connection length region is preferably longer than an electrical connector to be connected thereto, whereby the aforementioned longitudinal displaceability can be achieved. Preferably, the LED connecting length region can have a length of the exposed, uninsulated longitudinal conductor tracks in a range of 2 cm to 12 cm, in particular approximately 5 cm, preferably as already described depending on the length of a division section of the LED strip.

The flexprint strip preferably has at least approximately the same width as the LED strip, in particular a width of approximately 8, 10, 12, 16 or 20 mm. This means that these two can be easily connected and placed straight on top of each other. Optionally, an electrical connection element with a width for several widths of LED strips can also be provided, specifically by configuring the conductor tracks accordingly in order to contact them.

Preferably, the longitudinal conductor tracks in the supply connection length region are configured as at least three, symmetrically arranged longitudinal conductor tracks. In particular, at least one middle contact guides a negative pole of an LED supply voltage and at least one-preferably both-outer contacts each guide a positive pole of the LED supply voltage. In particular, the positive pole and negative pole are each electrically connected to the associated longitudinal conductor track in the LED connecting length region. In particular, the conductor tracks are configured with a sufficient cross-section, in particular with a sufficient width, to conduct the currents required for the LEDs, but at the same time with sufficient distances from each other and from the edge to avoid short circuits and enable secure contacting by soldering or plugging-on.

Preferably, the longitudinal conductor tracks in the supply connection length region are provided in a polarity-reversal-proof arrangement, in particular symmetrical about a longitudinal central axis of the flexprint strip. This creates a polarity-reversal-proof contact at which it does not matter in which direction a contacting plug is plugged on. In addition to the convenience and avoidance of connection errors, this also allows the cable outlet to be accomplished either to one side or the other. This symmetry or polarity-reversal protection in the electrical sense can be configured either on the side of the electrical connection element or on the side of the electrical connector that comes into contact with it, or on both sides. Configurations in which the (electrical) symmetry is produced on the side of the electrical connector can possibly be structurally associated with less effort, so that the associated electrical connection element does not necessarily also have to be configured to be (electrically) symmetrical, with the result that for example, structurally complex intersections of conductor tracks on the flexprint strip can be avoided (optionally, however, an optical symmetry can still be formed, e.g. to make the polarity reversal protection obvious to the user).

With reference to the drawings, the following can be stated: in one exemplary embodiment, the connection element (40) and the plug element (50) are connected to the symmetrical conductor tracks. This is a different technology from flexprint conductors. This is not the case with the flexprint lead of the flexprint strip (41), since this is manufactured in a continuous process. (Flexprints are etched, which is possible with conventional processes up to 70 μm.)

The flexprint strip (41) is preferably constructed according to the technology called FFC (Flat flex cable).

This now has a layer height of 200 μm. As a result-according to the invention-significantly higher currents can be transported and there is a significantly lower voltage drop.

In addition, these can be made endless, which is not possible with the etched variant.

Preferably, the electrical connection element is configured on the side of the supply connection length region in order to be contacted or soldered to a linear lead via a connector in such a way that the supply connection length region can be extended. The linear lead can for example, be a (long, endless) flex conductor strip with the same conductor track arrangement as in the supply connection length region. This extension provides a contact option via the linear lead at any point along the axis of the profile system, preferably over the entire profile length. Thus, connections can also be made via corners or angles of the profile course. The linear lead can be connected to an electrical connection element on one or preferably on two sides, which for example brings advantages in terms of voltage drop.

The invention also relates to an electrical connector configured for electrical supply of an LED strip glued in a profile system, in particular by means of an electrical connection element—as described in this document. According to the invention, this electrical connector comprises:

- An electrical printed circuit board (PCB) or an overmoulded leadframe, with at least two electrical spring contacts on one underside. These spring contacts are configured and arranged to provide an electrical supply to the LED strip in the assembled state of the connector.
- A cable outlet with at least two cable connections on a top side opposite the underside, which is configured to be connected to a power cable for electrically supplying the LED strip.

A holding device, in particular a clip element, snap element or magnet, which is configured to snap on a profile system on a profile rear side facing away from the LED strip or connection side. For example, with spring-loaded locking lugs, which during assembly (preferably without tools, e.g. releasably by applying force) engage in a recess on the profile system, preferably within the profile system.

The holding device can in particular be a plastic part with at least one resiliently mounted clip or snap element. This is assembled in one piece with the PCB to form the electrical a snap connection, a positive connector, e.g. with connection, by adhesive, or by means of injection moulding. The holding devices are preferably configured in such a manner that in the assembled state they can be moved relative to the profile axis on the electrical connection element, preferably without great application of force.

Preferably, the spring contacts are configured and arranged with circuit board spring contacts in a polarity-reversal-proof manner. Preferably, several of these spring contacts can be arranged to be electrically connected to one another for contacting the same electrical pole. For example, with at least three printed circuit board spring contacts, preferably arranged mirror-symmetrically about a central axis and connected electrically symmetrically about this central axis, preferably in the form of high-current spring contacts or high current spring fingers, similar to these are used, for example, when contacting batteries in mobile devices. Thus, a simple and reliable contacting can be ensured, especially at higher currents.

The cable connections are preferably configured in the form of spring-loaded terminals, insulation piercing terminals and/or soldering eyes on the PCB or in the overmoulded leadframe (or as a plug). Thus, a cable, which for example can already be installed in a ceiling can be attached directly to the electrical connector on site to supply power.

The invention also relates to an electrical connection element which is constructed with at least one electrical connector described above. This can specifically have a cable outlet that leads laterally or upwards in relation to the profile for connection to a supply voltage.

The invention also relates to an electrical connector element, consisting of two electrical connectors, as described in this document, which are connected to at least one, in particular multi-pole, cable. The cable is preferably flexible, e.g. a stranded cable, and can be constructed as a two- or multi-pole cable or preferably from several individual strands. In particular, a connection to at least one, and optionally several, DC safety extra-low voltages can be provided as operating voltage to supply the LEDs. Optionally, a data connection for bus control of the LEDS, in particular also polarity-reversal-proof or tolerant, can also be provided, especially with a symmetrical connection arrangement on the plug and/or socket side.

A preferably flexible connection between several profiles can thus be produced, which can preferably also lead around angles or corners thanks to the flexibility. With the already described displaceability of the electrical connector elements (along the profile and relative to the electrical connection elements), simple assembly can be provided, since the profiles can still be moved relative to one another after the electrical connection by sliding the electrical connector elements on the electrical connecting elements. This electrical connector element can be specially configured to establish an electrical connection between two electrical connection elements according to the invention, which are described here.

The invention also relates to an electrical connector element with an overmoulded leadframe or a PCB with at least a first group of at least two spring contacts, on an underside, and a second group of at least two spring contacts, on the underside, which are electrically connected to each associated spring contacts of the first group. Furthermore, the electrical connector element has a (preferably plastic) clip element on the top, which is configured to snap onto (or into or over) a profile system on a profile rear side facing away from the LED strip. The first group contacts a first connection element of a first LED strip and the second group contacts a second connection element of a second LED strip, with the result that these are electrically connected to one another in the assembled state.

The invention also relates to an electrical connection system for an LED lighting profile with at least one electrical connection element described here for attachment in the lighting profile and at least one electrical connector described here for the electrical connection element.

The invention also relates to an LED lighting profile, specifically as an extruded aluminium profile and with at least one electrical connection system described here. The aluminium profile can in particular be configured in an H-shaped basic shape, specifically with two side walls and a, preferably continuous, crossbar connecting the side walls on the inside and which is spaced apart from the edge of the side walls.

The invention also relates to an LED lighting system with at least one LED strip, at least one preferably translucent (e.g. opaque or opal) cover and at least one LED lighting profile as described here. This LED lighting system preferably comprises at least one front-side end cap for the aluminium profile. Preferably, this end cap can be configured on its inner side, which is not visible in the assembled state, with a recess which is configured and arranged in such a way as to accommodate the folded region (bending region, bending radius) of the electrical connection element. Alternatively, the crossbar of the profile around which the connecting element is bent could also be excluded.

The invention also relates to a method for connecting an LED strip to a supply voltage via an electrical connection element described here, which comprises:

adhesively bonding an end region of the LED strip onto an LED connecting length region of the connection element, in particular with a defined positioning based on a measuring system on the LED connecting length region.

An electrical connection, in particular soldering, of connection pads of the LED strip with longitudinal conductor tracks on the LED connecting length region.

Adhesively bonding a supply connection length region of the connection element onto the rear side of the profile at a profile end of a profile system, wherein a bending point marking comes to lie at the profile end of the profile system.

Bending the electrical connection element around the profile end of the profile system so that the LED connecting length region comes to lie on a profile front side.

Adhesively bonding the LED connecting length region and the LED strip on the profile front side.

In particular by connecting the supply voltage to the supply connection length region by plugging an electrical connector described here on the profile rear side.

Many advantages can be achieved with the present invention, for example:

Continuous lighting at corner connections, with simple contacting via a flexible connector element;

easy mounting on the ceiling due to a flexible or movable connection;

a variable position of the feed;

It would be possible to pull in connection cables in advance at the construction site. Until now, the connection cables were fixedly mounted on the profile. This also simplifies the packaging and transport of the profiles and, on the other hand, results in easier handling when installing lights at the construction site. Disturbing pieces of cable are eliminated.

A simple compensation of the voltage drop over long profile lengths (especially of the LED strip), with multiple feeds, with the result that high powers are possible over long lengths;

Feed to the LED profile without drilling, since contacts are pulled onto the rear side by means of a flat strip;

Easy configurability, even of more complex LED lighting profiles possible online via an internet design tool;

Compact design, which also makes it possible to use with small profiles (e.g. 10 mm);

Polarity reversal protection;

Tool-free connection.

Another advantage is that the connection element does not have any elevations, such as with a conventional cable that is plugged or soldered to the flexprint. As a result, no shadows or interference of the light emitted by the LED is obtained.

Another advantage is that no cable is mounted directly on the profile. This makes transport and storage easier. There is no need for strain relief of the connection cable with small profiles, which is difficult per se.

In addition, handling the profile during assembly is made easier because there is no cable on the profile.

Further advantages, features and details of the invention are obtained from the following description, in which exemplary embodiments of the invention are described with reference to the drawings.

The reference list as well as the technical content of the patent claims and figures, is part of the disclosure. The figures are described consistently and comprehensively. The same reference numbers mean the same components, reference numbers with different indices indicate functionally identical or similar components.

DETAILED DESCRIPTION OF THE PREFERRED EMBODIMENTS

Figure 1A:
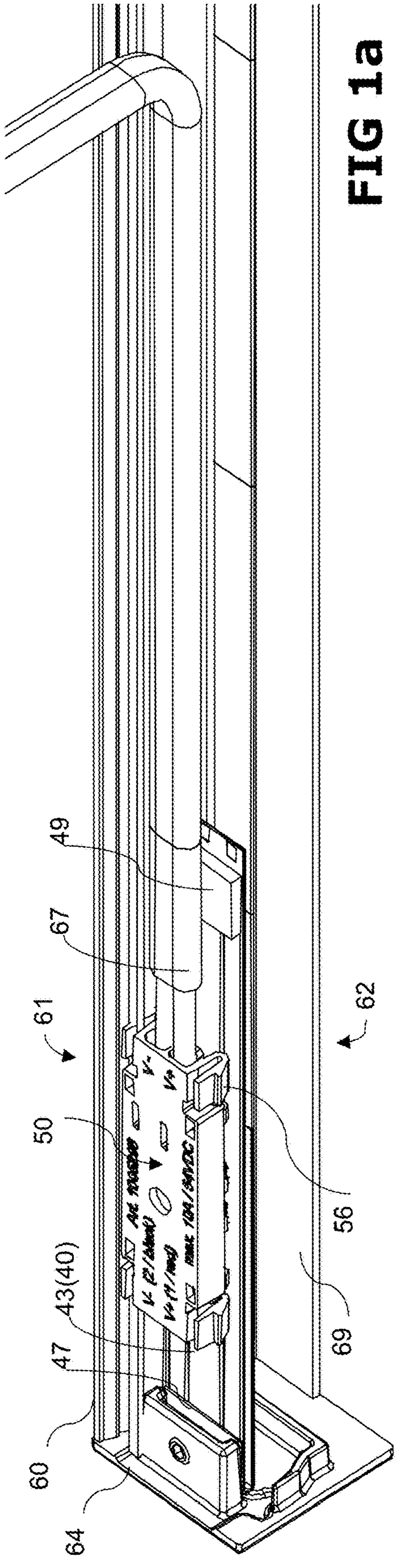
FIGS. 1*a* to 1*b* show an example of an embodiment of a connection system according to the invention for an LED lighting profile in different perspective views.

FIG. 1*a* shows components according to the invention of a connection system for LED lighting systems 81 for emitting light via a light cover 69, seen from the profile rear side or connection side 61. The connection system is configured specifically for LED lighting profiles 60, for example as an aluminium profile with an H-shaped cross-section, which can be connected to an end cap or terminating cap 64 or with another profile (see e.g. FIG. 8*a*) on the front side. The lighting system 81 is supplied with electricity via cable 67, preferably but not necessarily with a safety extra-low voltage (SELV), for example of 48 V, 24 V, 12 V or 5 V. This cable 67 is connected electrically to an electrical connector 50 according to the invention as a type of plug element, which is configured to be attachable to the profile 60 via clip elements 56, preferably in a detachable form. Via this electrical connector 50, the current is conducted from the cable 67 to an electrical connection element 40 according to the invention, specifically to its supply connection length region 43. The electrical connector 50 is preferably displaceable in the assembled state along the profile axis on the electrical connection element 40, wherein a stop or stopper element 49 can be provided, which prevents displacement beyond the end of the connection element 40. In order to ensure that, when installing an end cap 64 or a professional connecting element, the connection element 40 is not damaged or short-circuited (e.g. by a screw or the like placed thereon), in this embodiment at the end of the profile a reinforcing element 47 is provided on the connection element 40.

Figure 1B:
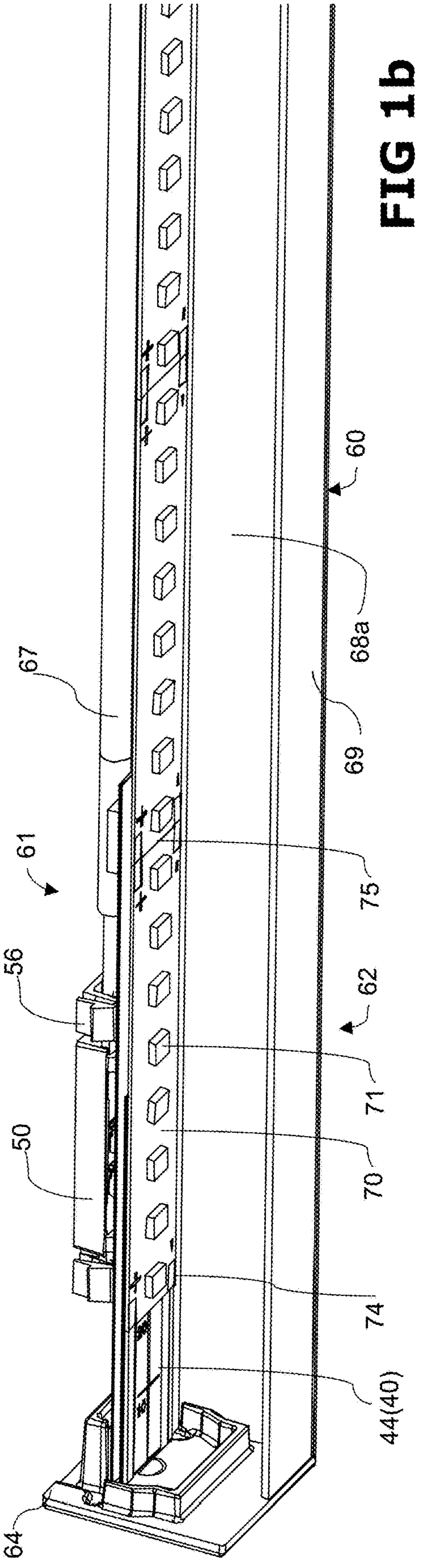

FIG. 1*b* shows the same components according to the invention in a connection system for LED lighting systems 81 as before, but seen from the profile front side or light side 62. In addition to the previously described elements 50, 56, 60, 64, 67 and 69, the LED connecting length region 44 of the electrical connector 50 according to the invention is shown here. An LED band or an LED strip 70 attached, in particular glued, in the profile 60 is electrically connected to this, specifically via the LED connection pads 74. Several LEDs 71 are mounted on the LED strip 70, which emit their light through the light cover or the light screen 69. The LED strip 70 is configured to be separable in length at provided LED strip separation points 75, at which it can be cut in discrete length steps to a length that matches the profile 60.

Figure 2A:
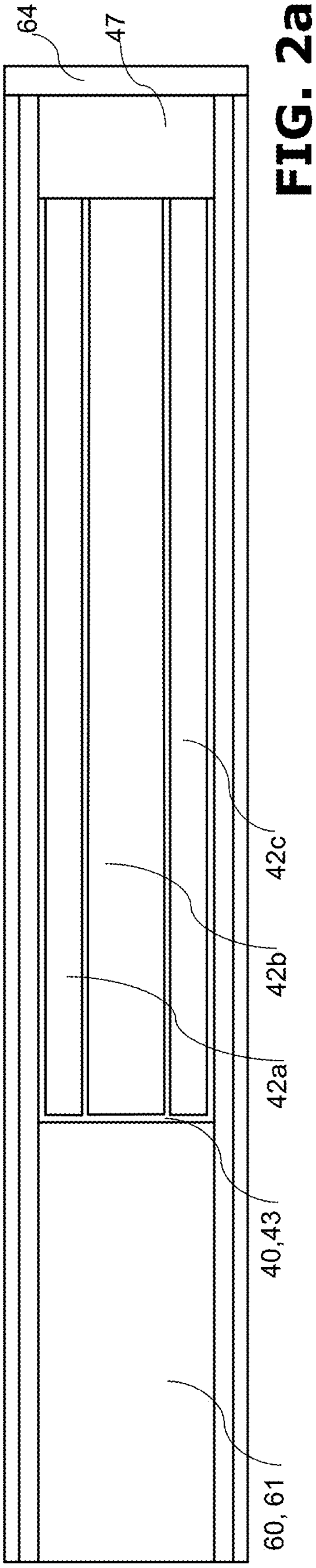
FIG. 2*a* shows a view of an embodiment of an electrical connection element according to the invention mounted on a profile.

FIG. 2*a* shows an LED lighting system equipped according to the invention in a top view of the connection side 61 of the profile 60. On this side of the profile 60, the supply connection length region 43 of the electrical connection element 40 is attached, preferably adhesively bonded.

Optionally protected by the reinforcing element 47, an end cap 64 is attached to the profile end, for example plugged on or fixed with a screw (not shown here). The supply connection length region 43 has three longitudinal conductor tracks 42*a*, 42*b* and 42*c*, which are open or blank and can be electrically contacted from the visible side. In the example shown, the two conductor tracks 42*a* and 42*c* form a common terminal for supplying the LED strip 70, and the conductor track 42*b* forms a second terminal. Since these generally have to carry the same current, their cross-sectional areas can be the same as shown, but their width can be different—with the same thickness. The conductor tracks are preferably located symmetrically around the profile longitudinal axis.

Figure 2B:
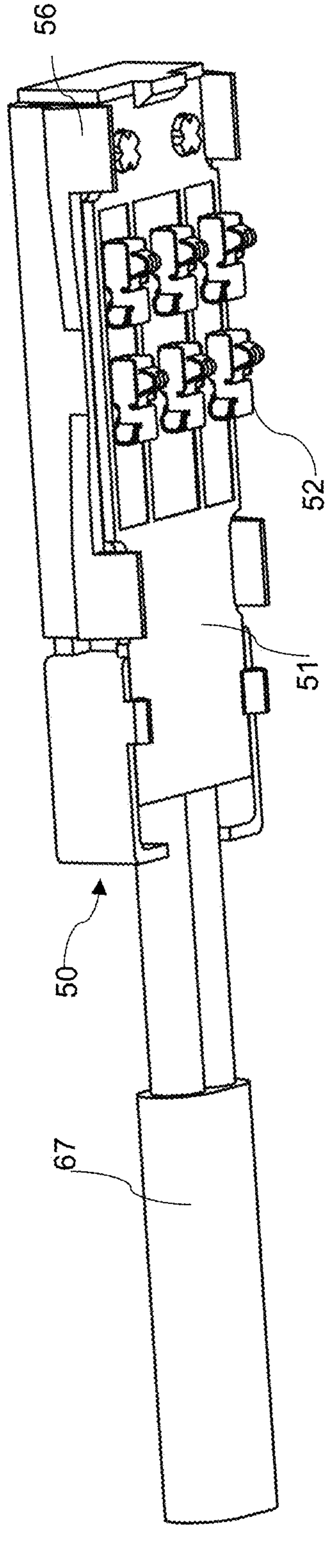
FIG. 2*b* shows a view of an embodiment of an electrical connector according to the invention or connection element.

FIG. 2*b* shows a perspective view of an electrical connector 50 according to the invention, which is designed to contact the supply connection length region 43 shown previously. With this a cable 67 can be contacted via spring contacts 52 to the conductor tracks 42*a*, 42*b*, 42*c* according to FIG. 2*a*. This embodiment of the electrical connector 50 is formed with a printed circuit board (PCB) 51 and a plastic housing as a connection housing. The PCB carries the spring contacts 52 and is fixed in the plastic housing, e.g. positively or non-positively, for example clipped in, snapped in, glued in or cast in. In an alternative embodiment, the electrical connector can also be configured as an overmoulded lead-frame or as an MID (moulded interconnect device) or spatial circuit carrier or as a plastic-overmoulded assembly with an overmoulded lead frame. The plastic housing is primarily configured to be snapped into the profile 60 in a releasable manner via the clip or snap elements 56, or optionally also by magnets, so that a contact is made between the spring contacts 52 and the conductor tracks 42*a*, 42*b*, 42*c*.

Figure 2C:
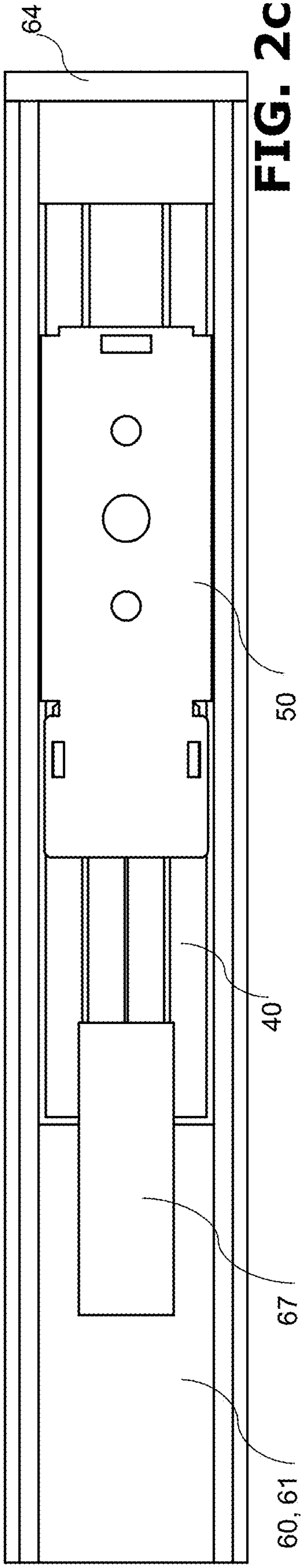
FIG. 2*c* shows a view of the previously shown electrical connector snapped onto the electrical connection element of FIG. 2*a*, FIGS. 3*a* to 3*f* show views of an exemplary embodiment of an electrical connection element according to the invention.

FIG. 2*c* shows an example in which the subject of FIG. 2*a* and the subject of FIG. 2*b* are plugged together so that the electrical connector 50 contacts the electrical connection element 40. The designated elements are already described in the previous figures.

Figures 3A, 3B, 3C, 3D, 3E, 3F:
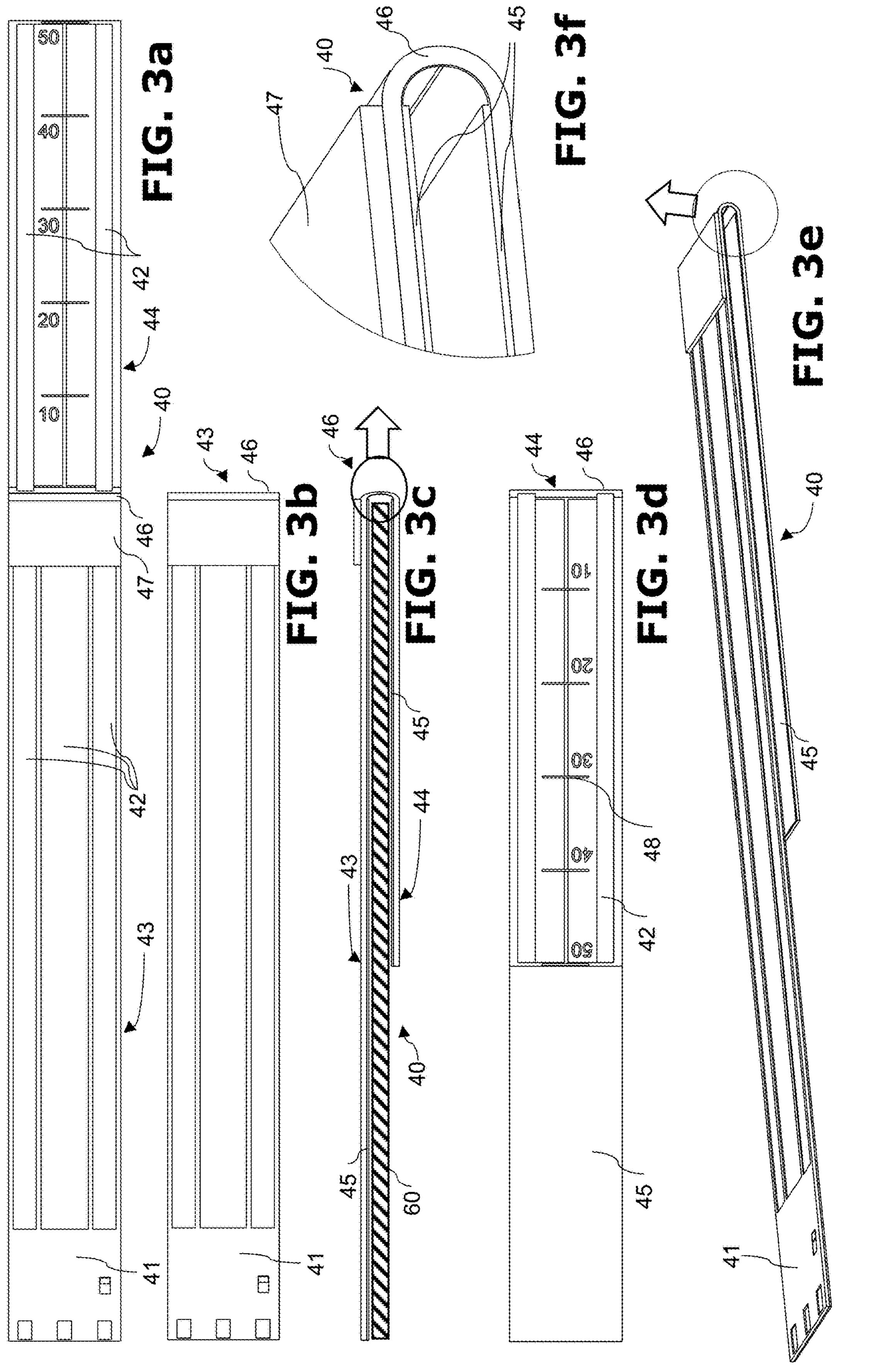

FIG. 3*a* shows an embodiment of an electrical connection element 40 in unmounted form, for example laid out flat as after its production, in detail. On the left is its supply connection length region 43 and on the right is its LED connecting length region 44. In between there is a bending point 46 or a bending point marking 46. The electrical connection element 40 is preferably configured with a flexprint 41, i.e. a flexible circuit board or flex circuit board, specifically as a flexprint strip. Optionally, it can also be configured as a classic, rigid circuit board or MID, which is already brought into the shape shown in FIG. 3*b* during production and can be plugged onto the profile end. The conductor tracks 42 on both sides, which can be contacted openly as seen from the view side, are each connected to one another, preferably in such a way that a symmetrical connection always results in the same polarity on the LED connecting length region 44, regardless of the insertion direction on the supply connection length region 43. The optional reinforcing element 47 is also shown.

FIG. 3*b* shows a mounted electrical connection element 40 seen previously in a view from the supply connection side 43, i.e. bent by 180 degrees at the bending point marking 46. The components shown have already been described.

FIG. 3*c* shows a mounted electrical connection element 40 from previously in a longitudinal sectional view through the profile system 60. The connection element 40 is bent at the bending point marking 46 by 180 degrees around or on the end face of the profile system, so that the supply connection length region 43 comes to rest on one side and the LED connection length area 44 comes to rest on the other side of the inner surface of the profile system 60. Preferably the electrical connection element 40 is placed at the bending point marking 46 at the end of the profile system 60, and the two sides are adhesively bonded in the profile system. For this purpose, the electrical connection element 40 is preferably provided with an adhesive surface or adhesive layer, so that only one protective strip has to be removed beforehand. Alternatively double-sided adhesive tape or adhesive can also be used, or a non-adhesive connection can also be made, for example using retaining clips or by clipping or pushing into the (appropriately shaped) profile system 60.

FIG. 3*d* shows a mounted electrical connection element 40 from previously in a view from the LED connection side. Since the profile system 60 is hidden, the adhesive surface 45 on the rear side of the supply connection length region 43 can also be seen here, which in this embodiment is longer than the LED connection length region 44. In addition to the conductor tracks 42, which are arranged and configured for connection to an LED strip, a measuring system 48 is also shown here in the form of a tape measure scale, which begins at the bending point 46 and at which a distance from the end of the profile can be read. This means that, as shown in the other figures, an LED strip 70 can be centred or positioned in a defined manner along the length of the profile system 60. For example, it can be advantageous to electrically and/or mechanically connect the LED strip 70 to the electrical connection element 40 before it is mounted; for example, since soldering (or positioning) inside a very narrow profile system can be difficult. According to the invention, a difference in length between the profile system and the LED strip 70 can be determined and the LED strip 70 can then be adhesively bonded to the electrical connection element 40 using the measuring system 48 at a distance from the profile end, which corresponds to half the difference in length, and then soldered. If the electrical connection element 40 with the connected LED strip is then placed at the bending point marking 46 at the end of the profile system and glued on both sides, the LED strip is exactly in the middle of the profile, which results in good, uniform illumination.

FIG. 3*e* again shows a perspective view of the electrical connection element 40, in mounted form, without the profile system 60, as already described above.

FIG. 3*f* shows a detailed view of the bend or bending point 46 from FIG. 3*c* or FIG. 3*e*, with the inner adhesive surfaces 45 (which can also run continuously over the bend region) and the reinforcing element 47, which can be attached in a fixed manner in the area of the bending point 46 on the connecting element 40 and optionally can also serve as bending point marking 46. It can be seen that there does not necessarily have to be a hard, angular bend around the profile wall at the bending point 46, but that a bending radius can also be formed in accordance with the mechanical flexibility of the flexprint of the connection element 40. Alternatively, the reinforcing element 47 can also be pushed or clipped on after the connecting element 40 has been attached to the profile end, e.g. at the end of the profile as a U-shaped plastic clip over both sides of the profile wall or the connection element 40, which insulates and/or mechanically protects the connection element 40 in this area.

Figure 4D:
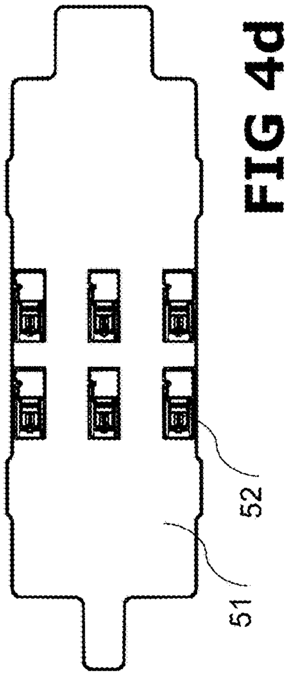
FIGS. 4*a* to 4*f* show views of an exemplary embodiment of an electrical connector according to the invention.
Figure 4E:
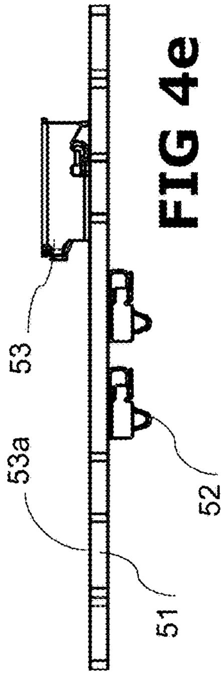
Figure 4F:
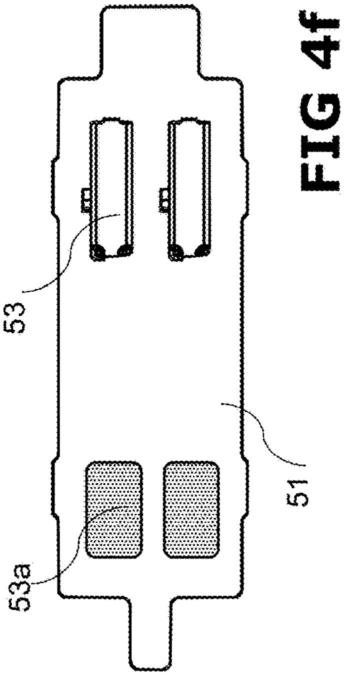
Figure 4A:
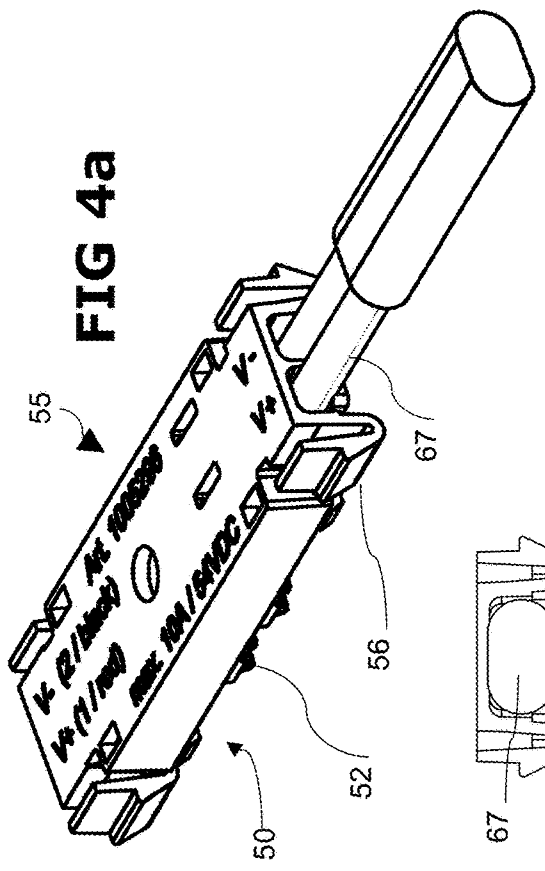

FIG. 4*a* shows a detailed view of an embodiment of an electrical connector 50 according to the invention from the top side 55 (or cable side or housing side). This has a cable outlet 67 or a connection for a cable 67, spring contacts 52 on its underside or contact side and a connector housing with clip elements 56.

Figure 4B:
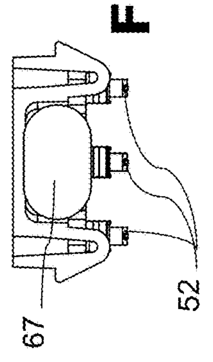

FIG. 4*b* shows a view from the side of the cable 67, in which the symmetrical arrangement of the spring contacts 52 is also visible.

Figure 4C:
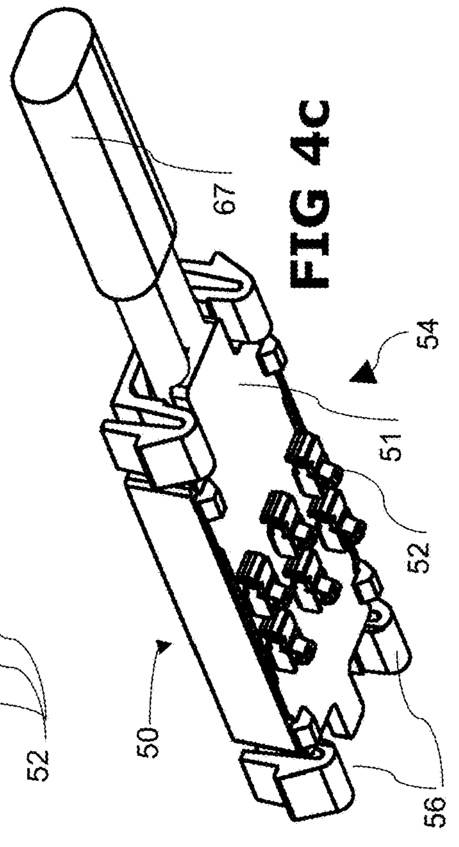

FIG. 4*c* shows the electrical connector 50 from the underside 54 (as the contact side or connection strip side). In this embodiment, the spring contacts 52 and their electrical connection to the cable 67 are implemented via a PCB 51.

FIG. 4*d* shows an example of an embodiment of such a PCB 51 with the spring contacts 52 in a view from above. These are implemented several times per electrical terminal-twice in the example shown—in order to ensure secure contact and/or to provide sufficient contact for the current intensity to be transmitted. The arrangement of the spring contacts 52 here is symmetrical about the (longer) central axis of the PCB 51, wherein the middle spring contacts 52 carry a first terminal of the supply voltage and the second terminal rests on the outer spring contacts 52 on both sides. If the connection element 50 is thus attached rotated by 180 degrees, the same polarity (polarity reversal protection) is obtained.

FIGS. 4*e* and 4*f* show a side view of the PCB 51 and a view from below. Here the cable connections 53 for the cable 67 (FIG. 4*a-c*) are shown. In particular, these can be implemented as solder contacts/pads 53*a* and/or as spring-loaded terminals 53 or insulation-piercing terminals or as crimp connections, screw terminals, etc.

Figures 5A, 5B, 5C, 5D:
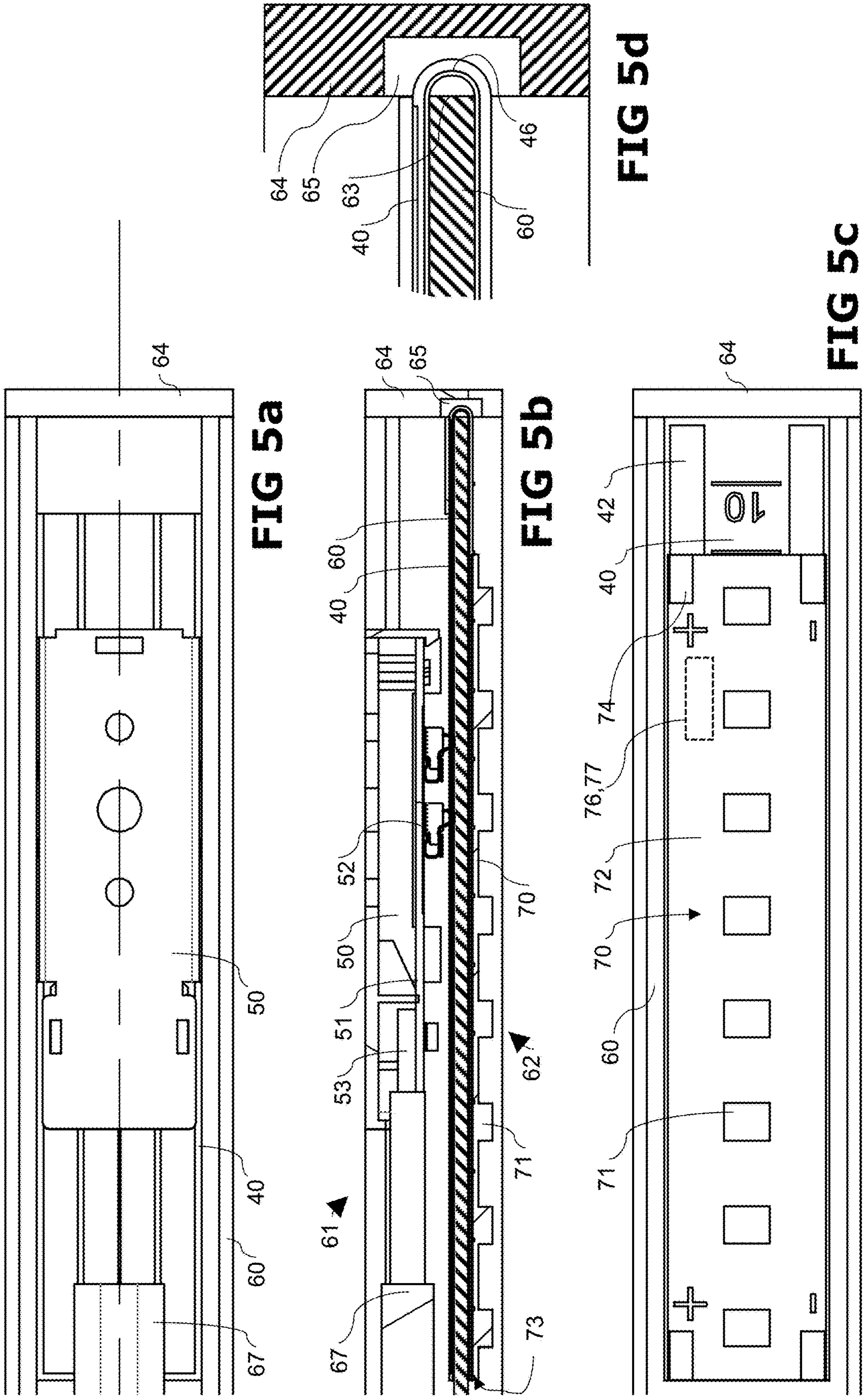
FIGS. 5*a* to 5*d* show views of an electrical connection system according to the invention for LED lighting profiles with an electrical connector and electrical connection element on an LED lighting profile or LED light profile.

FIG. 5*a* shows a similar view from the view of the connection side 61, like FIG. 2*c*—to which reference is made for details—in which a connector 50 according to the invention and a connection element 40 according to the invention on an LED lighting profile 60 interact for connection with a cable 67. The longitudinal axis of the profile system 60 is shown, which serves as a plane of intersection for the following view.

FIG. 5*b* shows a sectional view along the aforesaid axis through the profile system 60, on which the LED strip 70 with the LEDs 71 is adhesively bonded at the bottom (on the light side 62) via its LED adhesive side 73, which is electrically connected to the connection element 40. The connection element 40 leads the connections upwards (to the connection or assembly side 61), where they are connected to a cable 67 by means of the connector 50, which can be detachably attached in the profile. The latter is accomplished via spring contacts 52 pressed onto the connecting element, which are arranged on a PCB 51, on which there are clamping and/or solder connections 53 for the cable 67.

FIG. 5*c* shows a view of the light side 62 with the LED strip 70 with the LEDs 71 on the LED flexprint 72 and its connection pads 74 for supplying and/or controlling the LEDs. This is electrically connected to the connection element 40 according to the invention, e.g. by soldering the connection pads 74 to the associated longitudinal conductor tracks 42, and can also be mechanically connected to this, e.g. by adhesively bonding the LED strip 70 onto the connection element 40. The LED strip 70 can also have an LED control circuit 76 and/or an LED control bus 77, wherein the latter is preferably also routed via connection elements 40 and connectors 50 according to the invention, e.g. in the form of additional terminals or connections, which are preferably also protected against polarity reversal.

FIG. 5*d* shows a detailed view of the profile end 63, i.e. the end face of the profile 60, on which an end cap 64 is attached. In this embodiment, a recess 65 is provided in the end cap 64 to accommodate the bend 46 of the connection element 40 around the profile end 63. Alternatively, the profile end 63 could naturally also be shortened accordingly, or the end cap 64 could be constructively configured in a different way in order to provide a practical and visually appealing end to the profile 60 with the curved connection element 40.

Figures 6A, 6B, 6C:
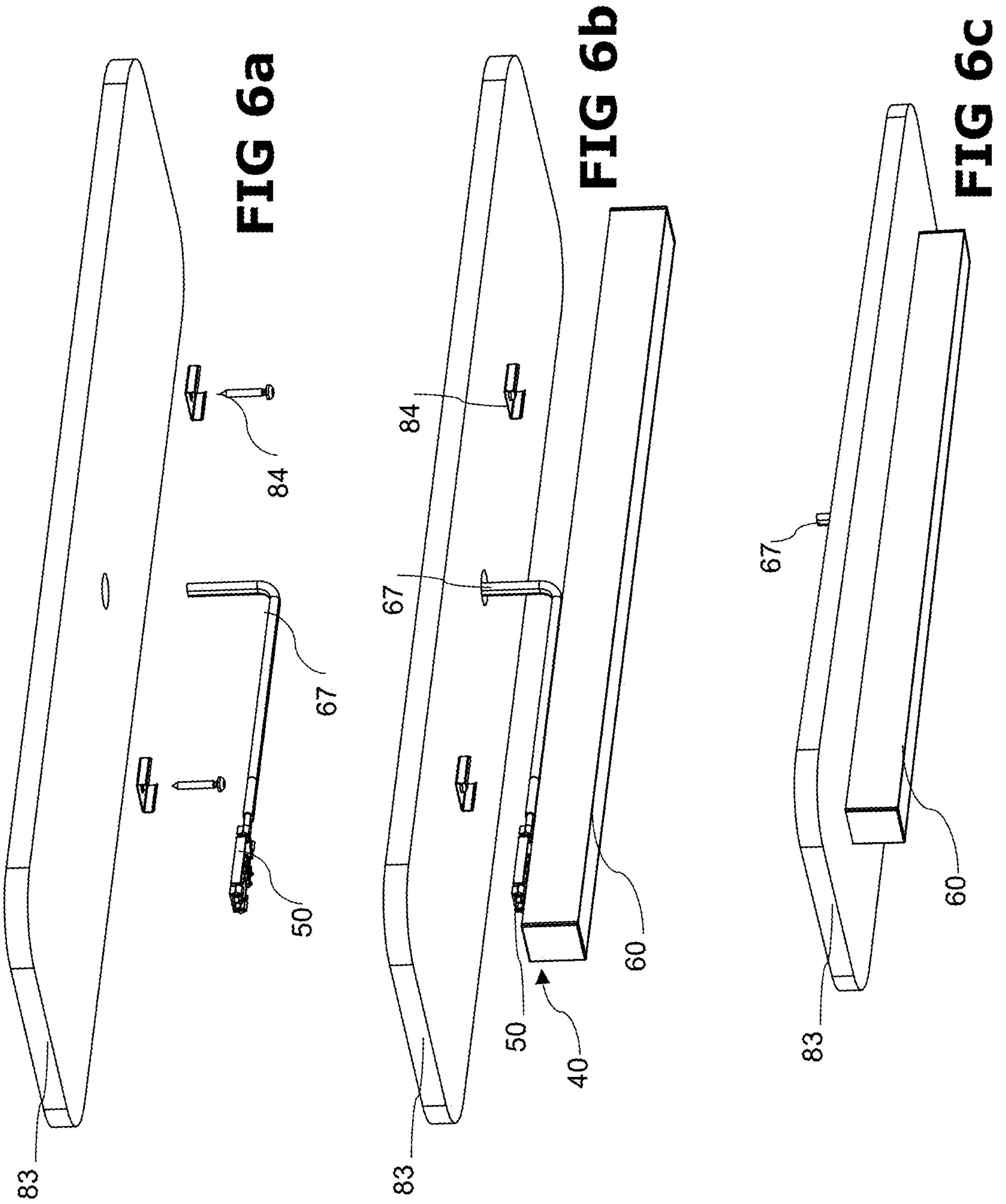
FIGS. 6*a* to 6*c* show an example of a connection or assembly of an LED lighting profile according to the invention.

FIG. 6*a* shows an example of an advantageous mounting of an LED lighting profile 60 equipped according to the invention on a ceiling 83. In addition to attaching the mounting material 84 to a cable 67 that has already been pulled in or is to be pulled in, an electrical connector 50 according to the invention is mounted, preferably without tools, e.g. with spring-loaded or insulation-piercing terminals, into which only the possibly stripped cable ends need to be inserted.

FIG. 6*b* shows how, in the case of the LED lighting profile 60 with an electrical connection element 40 according to the invention pre-assembled on site or at the manufacturer, the electrical connector 50 is clipped into the profile system 60 from behind.

FIG. 6*c* shows how the LED lighting profile 60 is then attached to the ceiling 83 by means of the mounting material 84, preferably also by clipping, optionally into the same profile of the LED lighting profile 60 into which the electrical connection element 40 is also clipped. Since the electrical connector 50 can be displaced in the axial direction on the electrical connection element 40, no or at least significantly less tension occurs in the cable 67, or the exact outlet position of the cable in the ceiling 83 is much less critical. Axial displacement, adjustment and centring of the mounted profile on the ceiling is also easier.

With the present invention, a simplified splitting up of profiles is also possible. This means, for example, that long profiles no longer have to be transported and assembled, which makes handling and assembly easier. The profiles can also be easily connected electrically, at any freely selectable angles.

Figures 7A, 7B, 7C, 7D, 7E:
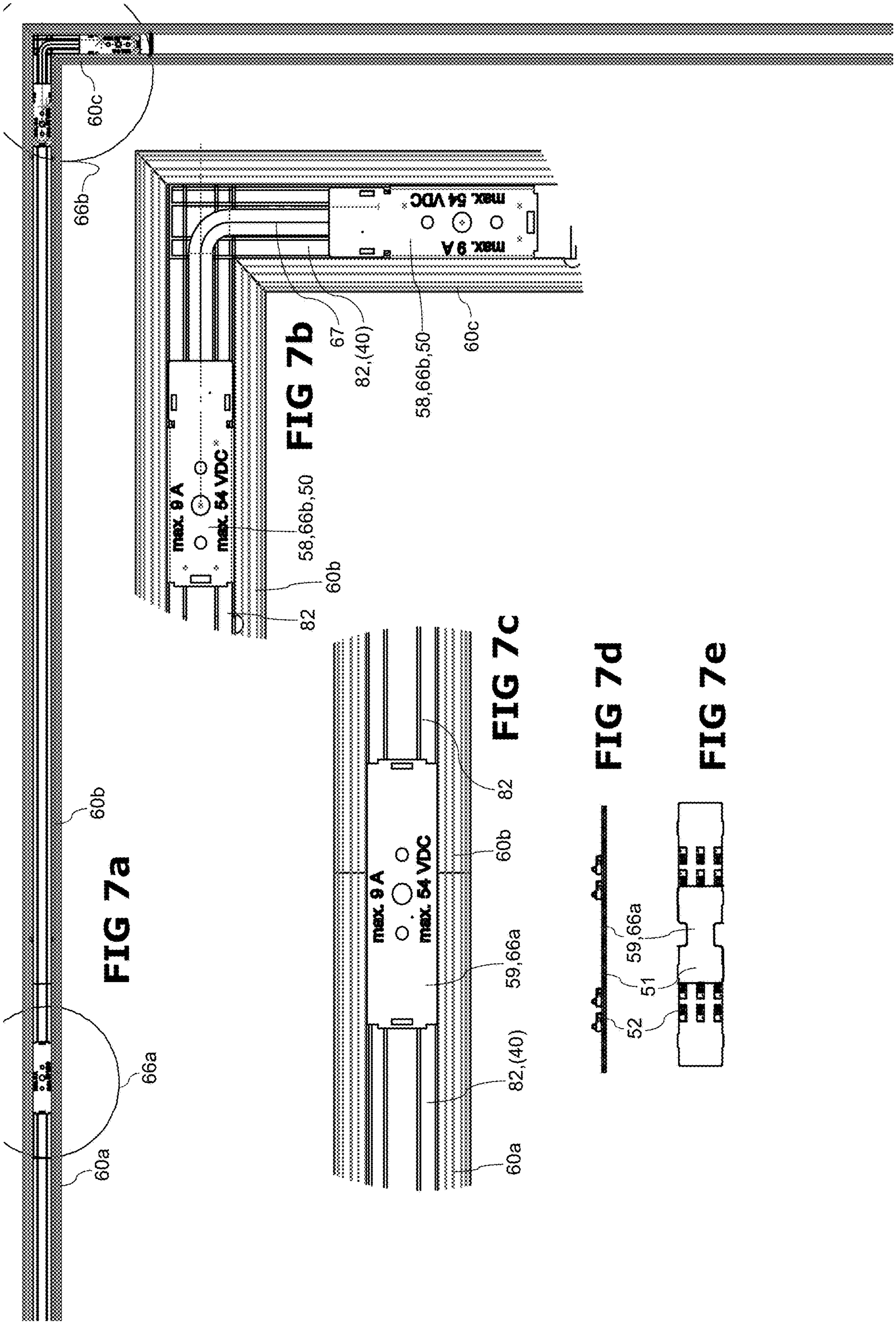
FIGS. 7*a* to 7*e* show examples of embodiments of angled and straight connections of several LED lighting profiles according to the invention with detailed views.

FIG. 7*a* shows an example of an embodiment in which several profile elements 60*a*, 60*b*, 60*c* are electrically connected to one another. On the left in the figure with a straight profile connection 66*a* with a rigid connection element 59 between 60*a* and 60*b*. On the right with an angle profile connection 66*b* with a flexible connection element 58 between 60*b* and 60*c*. In an embodiment not explicitly shown here, a straight profile connection 66*a* can also be produced with the flexible connection element 58. Especially in the case of longer profiles, instead of or in addition to a connection, feeds according to the invention can also be implemented with connectors 50 at several arbitrary locations which prove to be advantageous.

FIG. 7*b* shows a detailed view of the corner connection 66*b* using the example of a right angle. According to the invention, in order to realize other angles, the profiles simply have to be cut off at a different angle; further modifications are not absolutely necessary. Shown here is an embodiment in which a linear line 82 is attached on the connection side in the profile system 60, which is electrically connected to the electrical connection element 50 at least on one, preferably on both sides. In an alternative embodiment according to the invention, the supply connection length region 43 of the connection element 40 can also be longer, e.g. as long as the maximum individual profile length. Preferably, however, an extension of the "normal length" connection element 40 described above is only carried out if necessary through a separate, e.g. linear line 82 in the form of an endless strip in the present case in order to have more flexibility to use the material more efficiently. Alternatively, a "normal-length" connection element 40 can also be used, wherein then in the corners the crossbar in the profile 60 is then cut off at right angles to the profile 60 in order to bend the connecting element on or around the resulting edge.

Shown here, the two linear lines 82 of the respective profiles 60*b* and 60*c* are contacted with two electrical connectors 50 connected to one another via a cable piece 67, and an electrical connection is thus made between them-even around a corner. The two connectors with the cable piece can be provided pre-assembled as a flexible connection element 58, or can be manufactured individually from individual connectors 50 and a piece of cable 67.

FIG. 7*c* shows an example of an embodiment of a straight joint 66*a* in detail. Instead of an equally possible flexible connection element 58, a rigid connection element 59 is shown here for producing the straight profile connection 66*a*. This rigid connection element 59 can be contacted on respective connection elements 40 on both ends of the profiles 60*a* and 60*b*. However, another embodiment is shown here, in which contact is made on respective linear lines 82. The linear line 82 can preferably be configured as a stick-on flexible conductor with at least two open longitudinal conductor tracks, which correspond in particular to the conductor track geometry of the connecting connection length region 43 or the LED connecting length region 44.

These linear lines 82, with which the connection elements 40 according to the invention can be connected or extended, can have other positive effects. For example, in the case of a single-colour LED (2-pole), the LED tapes or strips are preferably connected with 0.75 mm-cable. The cross-section should be as large as possible in order to minimize the voltage loss across the line. This is in contrast to the LEDs/solder pads on the LED strips which are becoming increasingly smaller. If the LEDs are multi-coloured, e.g. RGB (4-pole) or RGBW (5-pole), it is almost impossible to use 0.75 $mm^2$. Therefore, the cross-section must be reduced in this case. Cables with a cross-section of 1.0 mm-would be optimal up to cable lengths of 10 m. As shown in the figures, this can be solved according to the invention by also using a flat band in the form of the linear line 82, which is simply connected to the connection element 40, e.g. soldered or via a plug connection. In a special embodiment of the invention a linear line 82 attached to the connection side 61 of the profile 60 can also be bent 46 directly as a connection element 40 at the profile end 63 to the light side 62, and/or connected to the LED strip, preferably on both sides of the profile 60. Thus, a feed can be made at any point(s) on the connection side 61 with a connector 50, and at the same time the conductor cross-section is also increased with the linear line 82, in particular since this is now also routed parallel to the LED strip on the rear side, in which larger conductor cross-sections can optionally be achieved.

FIG. 7*d* and FIG. 7*e* show a rigid connecting element 59 again in detail in plan and elevation. The spring contacts 52 are connected on a line on the PCB 51. Optionally, a cable connection 53 can also be present on the rigid connection element 59 in order to be able to implement a feed with this.

Figure 8A:
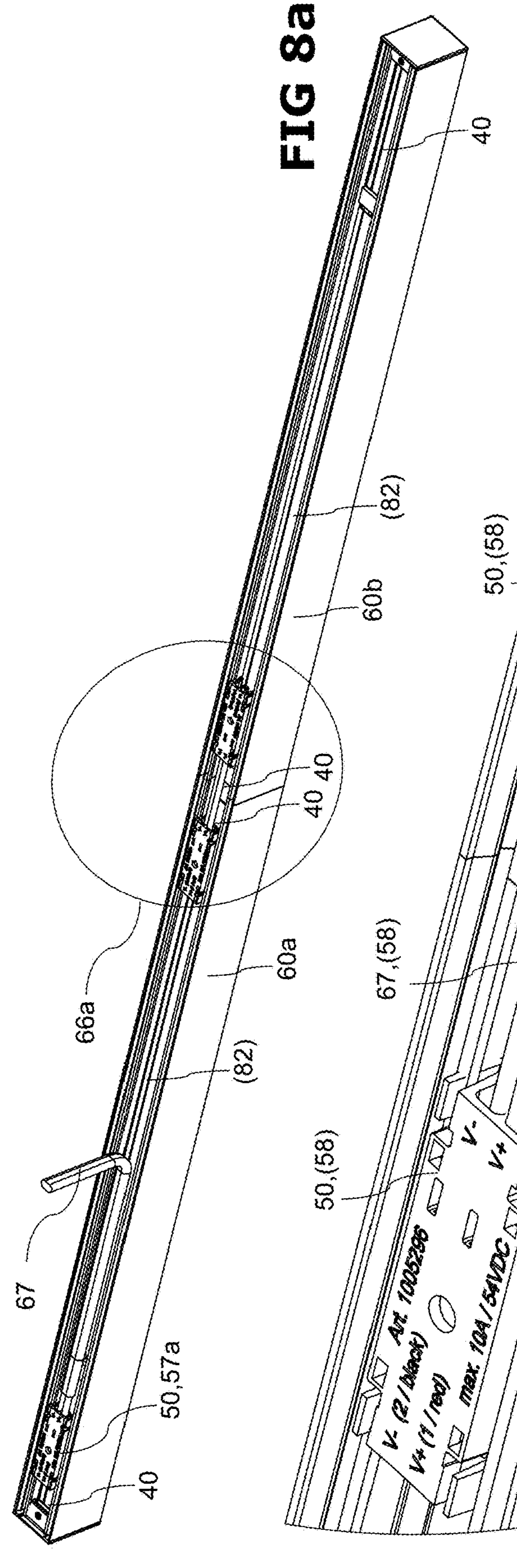
FIGS. 8*a* to 8*b* show an example of a further embodiment of straight connections of several LED lighting profiles according to the invention.
Figure 8B:
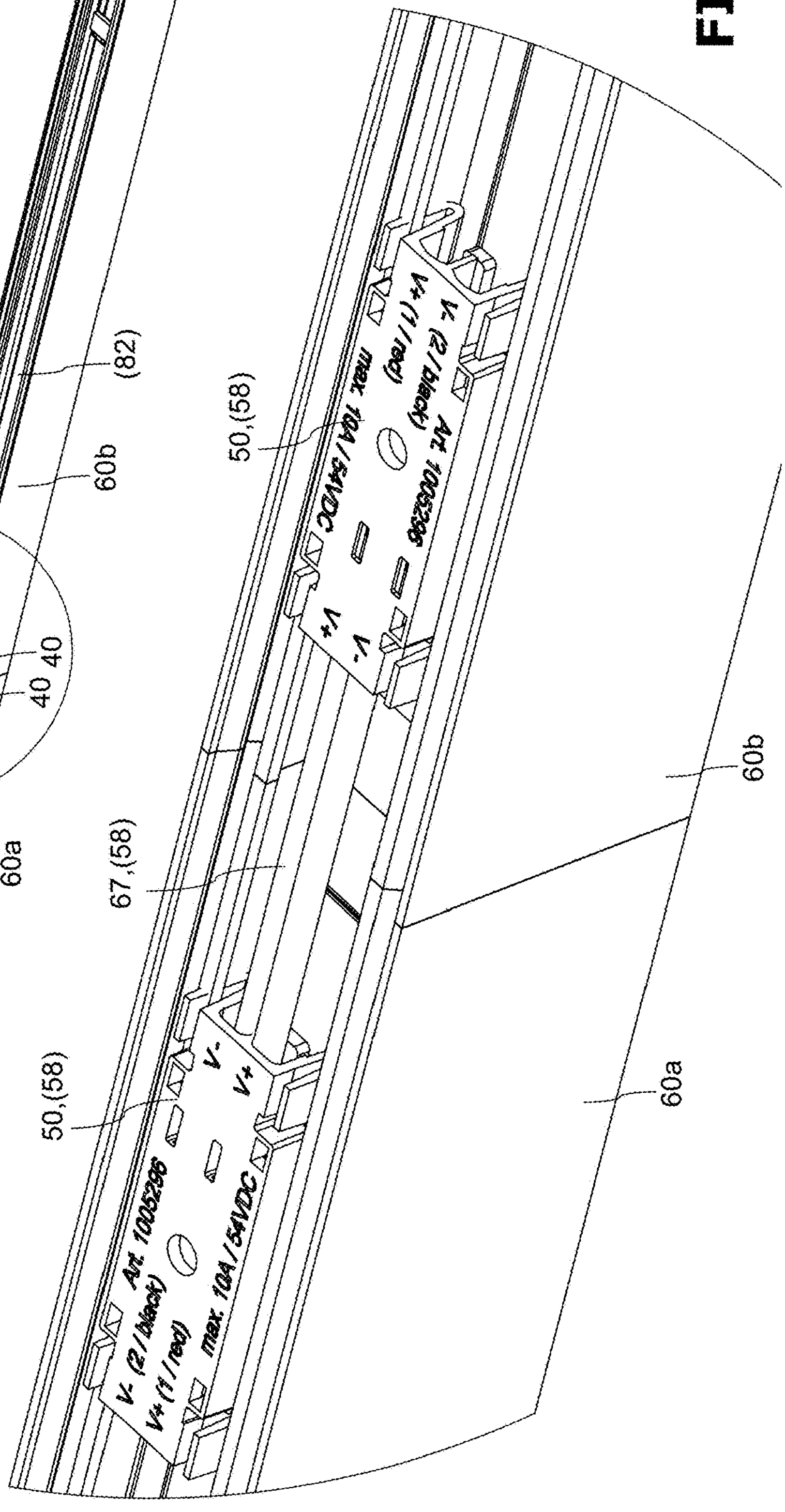

FIG. 8*a* and the detailed view FIG. 8*b* again show an example with a straight profile joint 66*a* between the profiles 60*a* and 60*b*, which is realized with a flexible connection element 58—as already described for FIGS. 7*a*, 7*b*, 7*c*. The supply from the cable 67 is produced via a connection element 40 via the straight cable connection element 57*a* or the connector 50. Further contact between the profiles 60*a*, 60*b* is also made via further connection elements 40 at the profile end in each case. Optionally, linear lines 82 can also again be used, which extend continuously over the respective profile rear side.

Figures 9A, 9B, 9C:
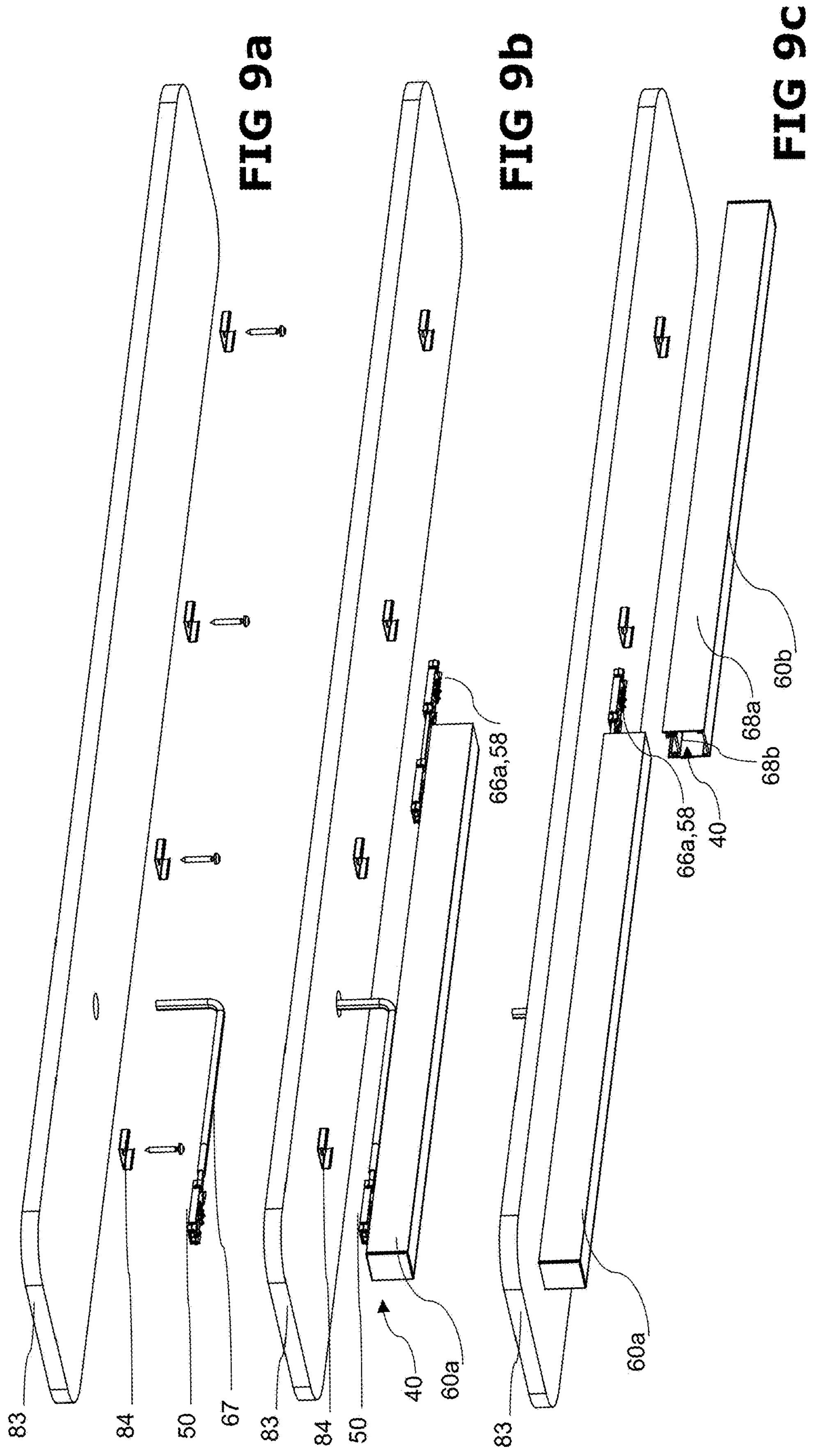
FIGS. 9*a* to 9*c* show an example of a connection or assembly according to the invention of several connected LED lighting profiles.

FIG. 9*a* shows an example of an advantageous assembly of an LED lighting profile 60 equipped according to the invention, consisting of several partial profiles 60*a*, 60*b* on a ceiling 83. In addition to attaching the mounting material 84 to a cable 67 that has already been pulled in or is to be pulled in, an electrical connector 50 according to the invention is mounted, e.g. with spring-loaded or insulation-piercing terminals.

FIG. 9*b* shows how, in the case of the LED lighting profile 60*a*, the electrical connector 50 is clipped into the profile system 60 from behind on the electrical connection element 40 in the profile 60*a*. Furthermore, a straight profile connection 66*a* with a flexible connection element 58 (alternatively also with a rigid connection element 59) is prepared by clipping in on one side.

FIG. 9*c* shows how the LED lighting profile 60*a* is then fastened to the ceiling 83 by means of the mounting material 84, preferably also by clipping. The second LED lighting profile 60*b* is then connected to the flexible connection element 58 and also fastened to the ceiling 83. Here too, the axial or longitudinal displaceability of the connectors or connection elements 58 is advantageous to make assembly easier since one has more clearance and can straighten the connecting cable between the profiles at the end.

Figures 10A, 10B, 10C, 10D, 10E:
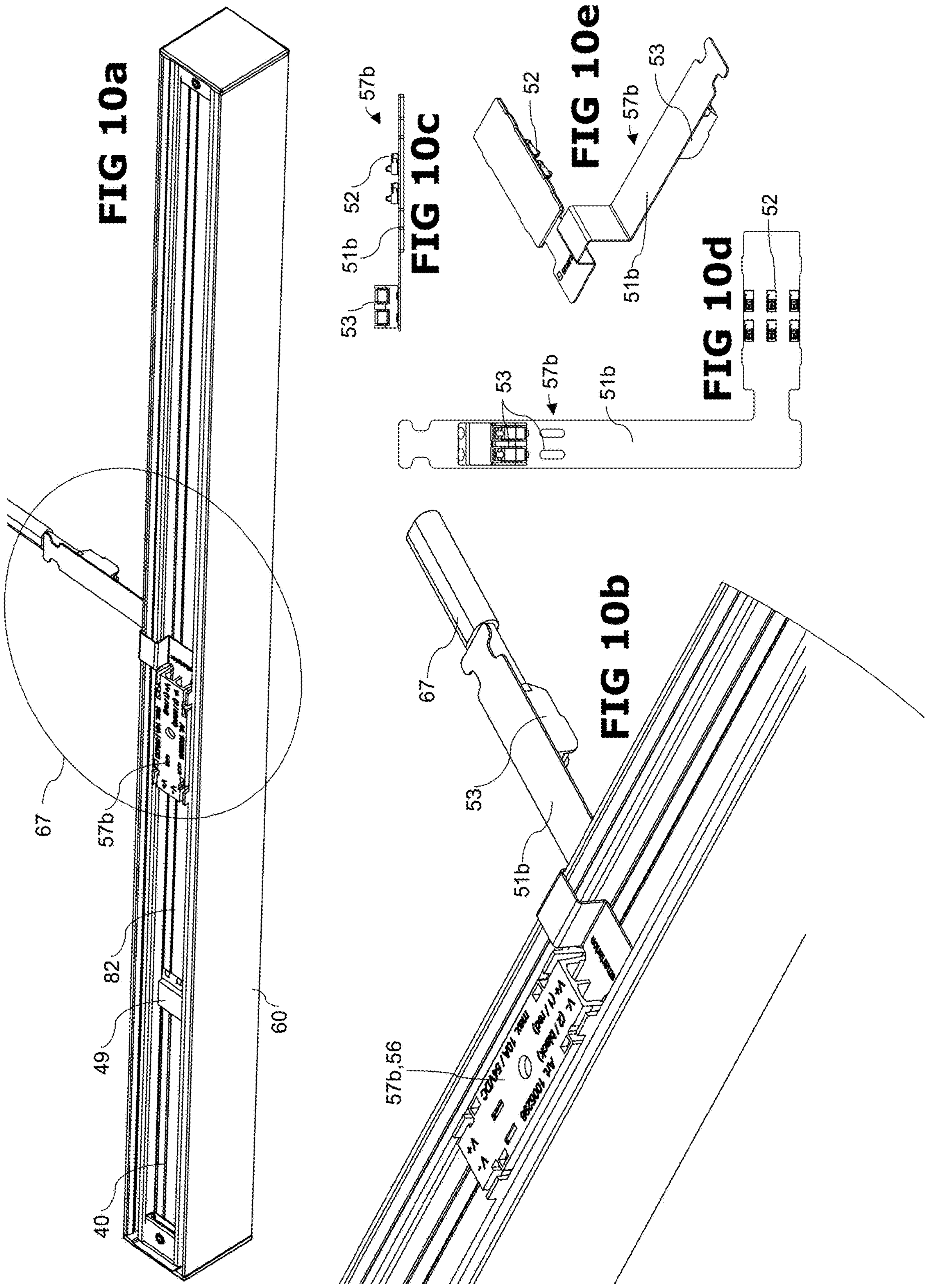
FIGS. 10*a* to 10*e* show an example of a further embodiment of electrical connectors with a side cable outlet.

FIG. 10*a* shows, instead of the previously shown straight cable connection element 57*a*, an embodiment with an angled cable connection element 57*b* as connector 50. This can be used to form a lateral cable outlet 67 from the profile system 60. In this case, an electrical connection element 40 and/or a flat conductor 82 is used, which is contacted with a connector 50, which is configured here as an angled cable connection element 57*b*. In an analogous manner, further forms of connectors 50 according to the invention can also be provided in order to meet special connection configurations.

In this specific example, the flat conductor 82 is connected to the connection element 40 behind the stopper element 49, e.g. soldered or clamped, or an embodiment of a previously described, straight profile connector 66*a* can also be used to connect connection element 40 and flat conductor 82 (if necessary without or with the stopper element 49 removed).

FIG. 10*b* again shows a detailed view of the side cable outlet 67 from previously, in which the construction site cable 67 is connected via the cable connector 53 to the PCB 51*b* of the angled cable connection element 57*b*, which PCB 51*b* can preferably be configured as a preformed circuit board or preferably also preformed flexprint or as MID, etc.

Due to the polarity reversal protection of this embodiment according to the invention, the connection side can be changed by rotating the angled cable connection by 180°. This is particularly important and advantageous for profiles with mitre cuts (since these are then no longer symmetrical). This results in a minimization of errors and a simplification for the customer, since sketches as to how this has to be produced on the construction site are no longer necessary.

FIG. 10*c*, FIG. 10*d* and FIG. 10*e* show different views of the angled cable connection element 57*b* from previously, with the clip-in connector housing 56 removed. This exemplary configuration is shaped, i.e. the PCB 51*b* is specially shaped in such a way that an assembly with a side cable outlet can be produced without adjustment to the profile 60. In contrast to the previous connector 50, here also spring contacts 52 and the cable connection 53 in the form of a spring-loaded or insulation-piercing terminal, solder pads, or the like are arranged on the same side of the PCB 51*b*.

Figures 11A, 11B, 11C:
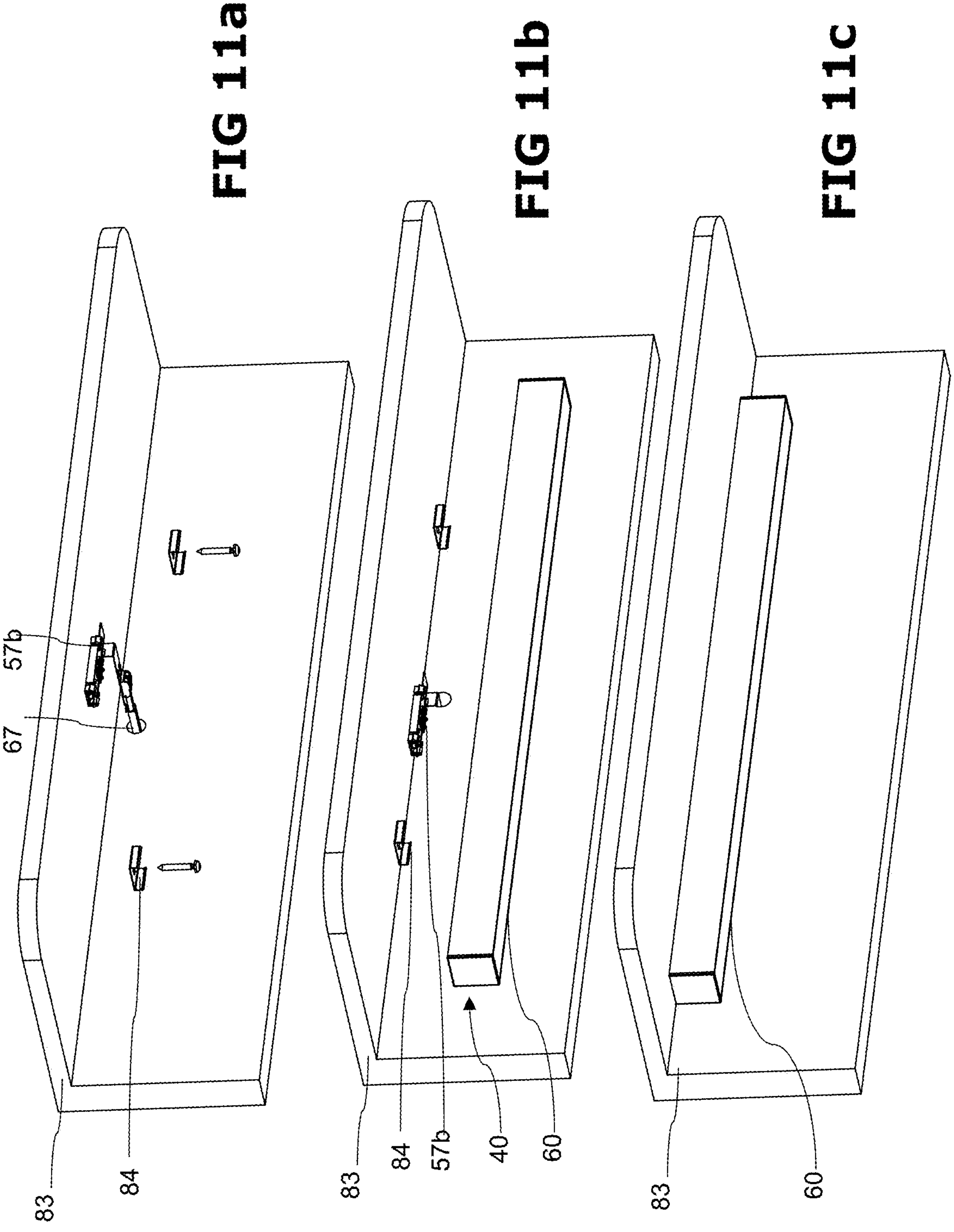
FIGS. 11*a* to 11*c* show an example of a connection according to the invention or an installation of an LED lighting profile with a side cable outlet.

FIG. 11*a* shows an example of an advantageous installation of an LED lighting profile 60 equipped according to the invention in a corner on the ceiling 83. In addition to attaching the mounting material 84 to the cable 67, an angled cable connection element 57*b* according to the invention is mounted.

FIG. 11*b* shows how the electrical connector 50 of the angled cable connection element 57*b* was brought into position in order to be clipped from behind into the LED lighting profile 60 with electrical connection element 40 and linear lines 82 by pressing the profile 60 onto these.

FIG. 11*c* shows how the LED lighting profile 60 is finally fastened flush in the corner 83 with a hidden cable outlet, without any recesses in the profile 60 being necessary. When using the linear lines 82, the feed point can also be moved as desired over the profile length.

Figure 12B:
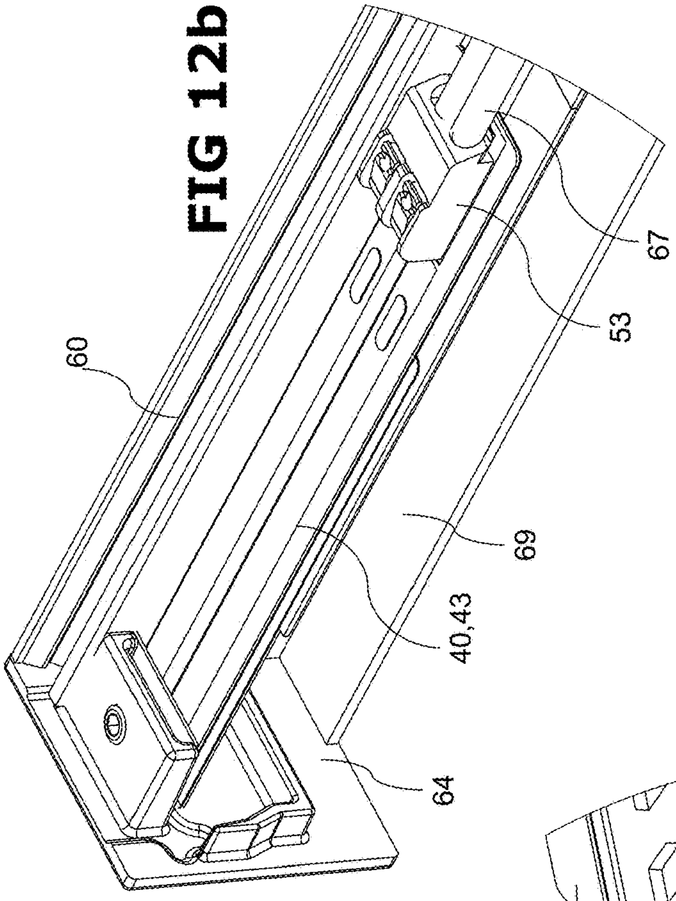
FIGS. 12*a* to 12*d* show an example of a connection according to the invention or an assembly of an LED lighting profile.
Figure 12C:
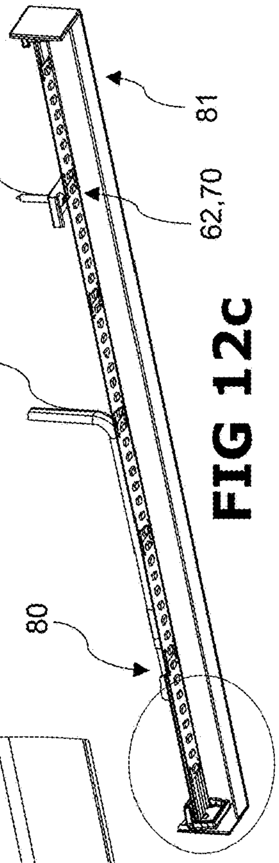
Figure 12A:
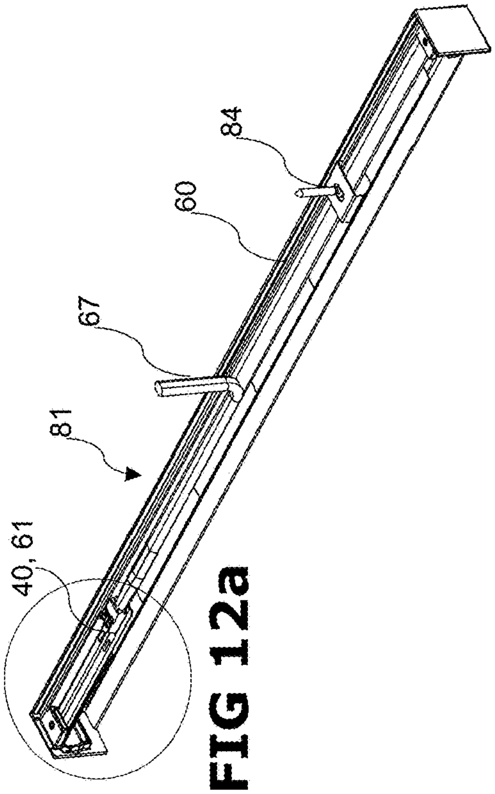
Figure 12D:
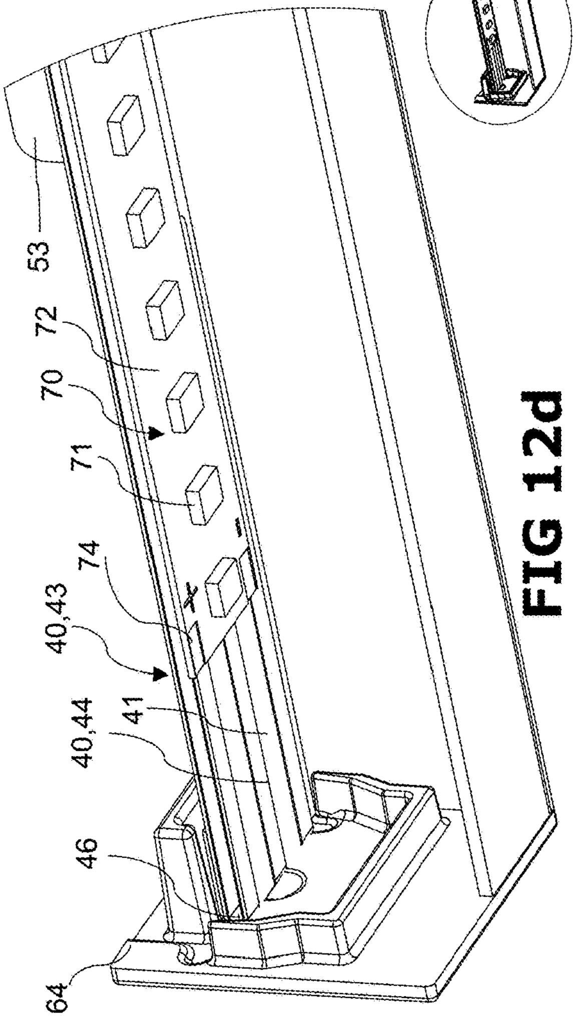

FIG. 12*a* and the detailed section marked therein in FIG. 121*b* as well as the similar views of FIG. 12*c* and FIG. 12*d* show a reduced embodiment according to the invention with an electrical connection element 40 which is fitted directly with a cable connection 53 for connection of a cable 67 in which a cable 67 can optionally be connected, i.e. without an explicit electrical connector element 50.

Thus, only such a simpler electrical connection element 40 needs to be provided, in which some of the aforementioned advantages of the clip-in connector 50 are not provided but which is sufficient for simple applications and has fewer individual parts. The other designated elements can be designed as described previously.

The structure shown here also solves the problem of using cables with relatively large cross-sections (e.g. B. 1 mm-Cu cross-section), which therefore cannot be easily soldered directly to the LED strip.

According to the invention, the embodiments shown, especially of at least the electrical connection element 40 and/or electrical connector 50, can be provided specifically as an electrical LED connection system 80 or connection set, modular system, but can also be provided individually, or together with the profile system 60 or as an entire LED lighting profile 81.

REFERENCE LIST

40 Electrical connection element
41 Flexible circuit board, flex circuit board, flexprint strips
42 (*a-c*) Conductor track, longitudinal conductor track
43 Supply connection length region, connecting connection length region
44 LED connecting length region
45 Adhesive surface
46 Bending point marking, bending point, bend
47 Reinforcing element, reinforcing plate
48 Measuring system/tape measure scale
49 Stopper element
50 Electrical connector, plug element
51 PCB, printed circuit board, overmoulded leadframe, MID
52 Spring contact,
53, 53*a* Cable connection, spring-loaded clamp, solder contact/pad
54 Underside, connection strip side
55 Top side, cable side
56 Clip element, connector housing, connector retaining clip, clip
57*a* Cable connection element straight
57*b* Cable connection element angled
58 Flexible connection element, cable connector element
59 Rigid connection element, fixed connector element
60 (*a, b, c*) Profile system, LED lighting profile
61 Connection side, profile rear sides
62 Light side, profile front side
63 Profile end, front side,
64 End cap
65 End cap recess
66*a* Straight profile connection, joint
66*b* Angle-profile connection, corner connection, mitre joint
67 Cable outlet, cable
68*a* Profile side wall, side wall of the profile
68*b* Profile web, crossbar, H-bridge of the profile, together with 68*a* this forms the profile that is closed with the light cover.
69 Light cover, cover, light shade
70 LED strip, LED tape
71 LED
72 LED flexprint, LED flex printed circuit board
73 LED adhesive side
74 LED strip connection pads
75 LED strip separation point
76 LED control circuit
77 LED control bus
80 Electrical LED connection system, connection set
81 LED lighting system, LED light rail system,
82 Linear line, adhesive flexprint line
83 Installation location, ceiling, corner of the room,
84 Mounting material, mounting brackets

The invention claimed is:

1. An electrical connection element (40) configured for electrical supply of an LED strip (70), which is fastened in a profile system (60), wherein the electrical connection element (40) is a flexprint strip (41), which has, a supply connection length region (43), which is configured with at least two exposed longitudinal conductor tracks (42), an LED connecting length region (44), which can be connected electrically with at least two longitudinal conductor tracks (42), whose positions correspond to connections of the LED strip (70), and with the LED strip (70), and an adhesive area (45) on the rear side of the connection element (40), wherein the electrical connection element (40) can be folded over at a bending point (46), which lies between the supply connection length region (43) and the LED connecting length region (44).

2. The electrical connection element (40) according to claim 1, wherein the flexprint strip (41) has a bending point marking (46) at the bending point.

3. The electrical connection element (40) according to claim 1, wherein the LED connecting length region (44) is provided with a measuring system/tape measure scale (48), starting at a bending point marking (46).

4. The electrical connection element (40) according to claim 3, wherein a reinforcing element (47) is applied to the flexprint strip (41) following the bending point marking (46), on the supply connection length region (43).

5. The electrical connection element (40) according to claim 1, wherein at one end of the supply connection length region (43) a stopper element (49) is applied to the flexprint strip (41), which provides a longitudinal stop at the end of the supply connection length region (43).

6. The electrical connection element (40) according to claim 1, wherein the electrical connection element (40) is configured to interact with an electrical connector (50) in such a manner that a snapped-on electrical connector (50) on the electrical connection element (40) can be moved along a profile direction.

7. The electrical connection element (40) according to claim 1, wherein the supply connection length region (43) or the LED connecting length region (44) has a length of the exposed longitudinal conductor tracks (42) in a range of 5 cm to 15 cm, wherein the supply connection length region (43) or the LED connecting length region (44) is longer than an electrical connector (50) to be connected to it, and/or the supply connection length region (43) or the LED connecting length region (44) has a length of the exposed longitudinal conductor tracks (42) in a range of 2 cm to 12 cm, and longer than a pitch section of the LED strip.

8. The electrical connection element (40) according to claim 1, wherein the flexprint strip (41) has at least the same width as the LED strip (70).

9. The electrical connection element (40) according to claim 1, wherein the longitudinal conductor tracks (42) in the supply connection length region (43) are configured as at least three symmetrically arranged longitudinal conductor tracks (42).

10. The electrical connection element (40) according to claim 1, wherein the longitudinal conductor tracks (42) in the supply connection length region (43) are provided in a polarity-reversal-proof arrangement about a longitudinal central axis of the flexprint strip (41).

11. The electrical connection element (40) according to claim 1, wherein the electrical connection element (40) is configured to be contacted or soldered to a linear line (82) in such a way that it can be lengthened so that the linear line (82) provides a contact option for an electrical connector (50) at any point along the axis of the profile system (60).

12. An electrical connector (50) configured for the electrical supply of an LED strip (70) which is glued in a profile system (60), via the electrical connection element (40) according to claim 1, wherein the electrical connector (50) has,

- a PCB (51) or overmoulded leadframe (51) with at least two spring contacts (52) on an underside (54),
- a cable outlet (67) with at least two cable connections (53) on a top side (55), and at least one of:
- a holding element (56) configured to snap onto the profile system (60) on a profile rear side (61) facing away from the LED strip (70), and
- the holding element (56) configured to magnetically attach to the profile system (60) on the profile rear side (61) facing away from the LED strip.

13. The electrical connector (50) according to claim 12, wherein the spring contacts (52) are arranged and configured in a polarity-reversal-proof manner, with at least three spring contacts (52), arranged mirror-symmetrically about a central axis and electrically connected.

14. The electrical connector (50) according to claim 12, wherein the cable connections (53) are configured as one of spring-loaded terminals, insulation piercing terminals and/or soldering eyes on the PCB (51) or the overmoulded leadframe.

15. The electrical connector (50) according to claim 12 comprising, a cable outlet (67) leading laterally or upwards for connection to a supply voltage.

16. Two electrical connectors according to claim 12, the two electrical connectors (50) connected to at least one cable (67), and configured to form an electrical connection between two electrical connection elements (40).

17. An electrical connector element (58, 59) with an overmoulded leadframe or a PCB (51) comprising:

- a first group of two spring contacts (52), on an underside (54), and
- a second group of two spring contacts (52), on the underside (54), which are electrically connected to associated spring contacts of the first group, and
- a holding element (56) configured to snap onto a profile system (60) on a profile rear side (61) facing away from an LED strip (70), so that the first group contacts a first connection element (40) of a first LED strip and the second group contacts a second connection element (40) of a second LED strip (70) and electrically connects them to one another in an assembled state.

18. An electrical connection system (80) for an LED lighting profile (60) comprising:

- at least one electrical connection element (40), according to claim 1, for attachment in the lighting profile (60), and
- at least one electrical connector (50) for the electrical connection element (40).

19. An LED lighting profile (60) having an extruded aluminium profile or plastic profile with at least one electrical connection system (80) according to claim 18.

20. An LED lighting system (81) comprising

- at least one LED strip (70),
- at least one translucent cover (69) and,
- at least one LED lighting profile (81) according to claim 19.

21. A method for connecting an LED strip (70) to a supply voltage via an electrical connection element (40), according to claim 1, comprising;

- adhesively bonding an end region of the LED strip (70) to the LED connecting length region (44) of the connection element (40),
- soldering connection pads of the LED strip (70) to longitudinal conductor tracks (42) on the LED connecting length region (44),
- adhesively bonding a supply connection length region (43) of the connection element (40) onto the profile rear side (61) on a profile end (63) of the profile system (60), wherein a bending point marking (46) comes to rest on the profile end (63) of the profile system (60),
- bending the electrical connection element (40) around the profile end (63) of the profile system (60) so that the LED connecting length region (44) comes to rest on a profile front side (62),
- adhesively bonding the LED connecting length region (44) and the LED strip (70) to the profile front side (62), and
- plugging an electrical connector (50) on the profile rear side (61) to connect a supply voltage to the supply connection length region (43).

* * * * *